(12) United States Patent
DeLuca et al.

(10) Patent No.: US 12,093,158 B2
(45) Date of Patent: Sep. 17, 2024

(54) DIGITAL TWIN MATURATION TRACKING

(71) Applicant: International Business Machines Corporation, Armonk, NY (US)

(72) Inventors: Lisa Seacat DeLuca, Baltimore, MD (US); Joseph G. Berti, Highlands Ranch, CO (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 16/587,081

(22) Filed: Sep. 30, 2019

(65) Prior Publication Data

US 2021/0096975 A1 Apr. 1, 2021

(51) Int. Cl.
  *G06F 11/30* (2006.01)
  *G06F 11/34* (2006.01)
  *G06Q 30/014* (2023.01)

(52) U.S. Cl.
  CPC ........ *G06F 11/3409* (2013.01); *G06F 11/301* (2013.01); *G06F 11/3051* (2013.01); *G06Q 30/014* (2013.01)

(58) Field of Classification Search
  None
  See application file for complete search history.

(56) References Cited

U.S. PATENT DOCUMENTS

| | | | |
|---|---|---|---|
| 5,790,848 A | | 8/1998 | Wlaschin |
| 9,671,777 B1 | * | 6/2017 | Aichele .................. B25J 9/1666 |
| 9,995,278 B2 | | 6/2018 | Lund |
| 10,380,692 B1 | * | 8/2019 | Parker .................... G06Q 40/08 |

(Continued)

FOREIGN PATENT DOCUMENTS

EP  3493128 A1 * 6/2019 ............. G06Q 10/06

OTHER PUBLICATIONS

Roland Rosen, Georg von Wichert, George Lo, Kurt D. Bettenhausen, "About The Importance of Autonomy and Digital Twins for the Future of Manufacturing", IFAC-PapersOnLine, vol. 48, Issue 3, 2015, pp. 567-572, ISSN 2405-8963, https://doi.org/10.1016/j.ifacol.2015.06.141. (Year: 2015).*

(Continued)

*Primary Examiner* — Paul R Fisher
(74) *Attorney, Agent, or Firm* — Monchai Chuaychoo

(57) ABSTRACT

Track transformations of mature digital twins from time of creation to decommissioning of the physical asset. As physical assets evolve, changes, repairs, maintenance and services relevant to the physical assets originally provided, can be applied or deemed inapplicable in the current state. Mature digital twins are leveraged to identify proposed changes to physical assets and compare original digital twins of the base asset to determine whether deviations over time render the proposed changes irrelevant. Irrelevant changes, due to deviations from the original digital twin, are further analyzed to determine whether the irrelevancy is due to a previous action performed on the physical asset and update to the mature digital twin. Previous updates to physical assets, reflected in the mature digital twin, can be eligible for rebates and incentives where the asset owners performed actions that render proposed updates irrelevant, while relevant changes are approved and permeated to mature digital twins.

20 Claims, 11 Drawing Sheets

(56) References Cited

U.S. PATENT DOCUMENTS

| | | | | |
|---|---|---|---|---|
| 2008/0208487 | A1* | 8/2008 | Goebel | G06N 3/126 |
| | | | | 702/34 |
| 2011/0213671 | A1* | 9/2011 | Hirson | G06Q 20/3255 |
| | | | | 705/16 |
| 2013/0318011 | A1* | 11/2013 | Jones | G05B 23/0243 |
| | | | | 706/12 |
| 2017/0060988 | A1* | 3/2017 | Kudo | G06F 16/285 |
| 2017/0151965 | A1* | 6/2017 | Brooks | B61L 15/0081 |
| 2017/0323240 | A1 | 11/2017 | Johnson | |
| 2017/0323274 | A1* | 11/2017 | Johnson | G05B 13/041 |
| 2018/0039249 | A1* | 2/2018 | Johnson | G05B 17/02 |
| 2018/0232459 | A1* | 8/2018 | Park | G05B 15/02 |
| 2018/0364651 | A1 | 12/2018 | Onetto | |
| 2019/0012637 | A1* | 1/2019 | Gillen | G06Q 10/0833 |
| 2019/0066377 | A1* | 2/2019 | Schoening | G06T 19/003 |
| 2019/0138333 | A1 | 5/2019 | Deutsch | |
| 2019/0138667 | A1* | 5/2019 | Benesh | G06F 30/13 |
| 2019/0147411 | A1* | 5/2019 | John | F01D 21/003 |
| | | | | 705/305 |
| 2020/0210268 | A1* | 7/2020 | Nuthi | G06F 11/0751 |

OTHER PUBLICATIONS

Dr. Shoumen Datta, "Emergence of Digital Twins: Is this the march of reason?" MIT Auto-ID Labs, Massachesetts Institute of Technology, Cambridge, MA. Oct. 15, 2016. (Year: 2016).*

Damiani et al., "Simulation and Digital Twin Based Design of a Production Line: A Case Study", Proceedings of the International Multi Conference of Engineers and Computer Scientists, 2018, vol. II, IMECS 2018, Mar. 14-16, Hong Kong. (Year: 2018).*

Batty, Michael. "Digital Twins." Environment and Planning B: Urban Analytics and City Science, vol. 45, No. 5, Sep. 2018, pp. 817-820, doi:10.1177/2399808318796416. (Year: 2018).*

F. Xiang, Z. Zhi and G. Jiang, "Digital twins technolgy and its data fusion in iron and steel product life cycle," 2018 IEEE 15th International Conference on Networking, Sensing and Control (ICNSC), 2018, pp. 1-5, doi: 10.1109/ICNSC.2018.8361293. (Year: 2018).*

Stein Ove Erikstad, "Merging Physics, Big Data Analytics and Simulation for the Next-Generation Digital Twins", HIPER 2017, High-Performance Marine Vehicles, Zevenwacht, Sout-Africa, Sep. 2017. (Year: 2017).*

Leiva, Conrad. "Demystifying the digital thread and digital twin concepts." Industry Week 1.2016 (2016): 2016. (Year: 2016).*

G. S. Martínez, S. Sierla, T. Karhela and V. Vyatkin, "Automatic Generation of a Simulation-Based Digital Twin of an Industrial Process Plant," IECON 2018—44th Annual Conference of the IEEE Industrial Electronics Society, 2018, pp. 3084-3089, doi:10.1109/IECON.2018.8591464. (Year: 2018).*

Bindal, S. (Sep. 26, 2017). Connected manufacturing. Computerworld Hong Kong, , n/a. Retrieved from https://dialog.proquest.com/professional/docview/1943385225?accountid=131444 (Year: 2017).*

Heber, Dominik, and Marco Groll. "Towards a digital twin: How the blockchain can foster E/E-traceability in consideration of model-based systems engineering." DS 87-3 Proceedings of the 21st International Conference on Engineering Design (ICED 17) vol. 3: (Year: 2017).*

Zheng, Pai, et al., "Towards an automatic engineering change management in smart product-service systems—A DSM-based learning approach," Advanced Engineering Informatics 39, 2019, 23 pages.

Mell et al., "The NIST Definition of Cloud Computing", Recommendations of the National Institute of Standards and Technology, NIST Special Publication 800-145, Sep. 2011, 7 pages.

* cited by examiner

DIGITAL TWIN MATURATION TRACKING

TECHNICAL FIELD

The present disclosure relates generally to the field of tracking physical assets and digital twins and more specifically to tracking the maturation of digital twins.

BACKGROUND

A digital twin is a virtual representation of a physical object, system or other asset. The digital twin tracks changes to the physical object, system or asset across the object's lifespan and records the changes as they occur. Digital twins are a complex virtual model that is an exact counterpart to the physical asset existing in real space. Sensors and internet-of-things (IoT) devices connected to the physical asset collect data, often in real-time. The collected data can then be mapped to the virtual model of the digital twin. Any individual with access to the digital twin can see the real-time information about the physical asset operating in the real world without having to be physically present and viewing the physical asset while operating. Rather, users such as engineers can use the digital twin to understand not only how the physical asset is performing, but to predict how the physical asset may perform in the future, using the collected data from sensors, IoT devices and other sources of data and information being collected. Moreover, digital twins can help manufacturers and providers of physical assets with information that helps the manufacturer understand how customers continue to use the products after the purchasers have bought the physical asset.

SUMMARY

Embodiments of the present disclosure relate to a computer-implemented method, an associated computer system and computer program product for tracking mature digital twins and applying relevant update permeations to the mature digital twins as needed or selected by owners of the digital twin. The computer-implemented method comprising creating, by at least one processor, a digital twin that depicts a physical asset as originally received, wherein changes to the physical asset over time are mimicked and reflected by modification of the digital twin as a mature digital twin; receiving, by the at least one processor, a request indicating a proposed change to the physical asset; identifying by the at least one processor, whether the physical asset is indicated to receive the proposed change based on the digital twin; comparing, by the at least one processor, the digital twin of the physical asset as originally received to the mature digital twin to determine whether the proposed change to the physical asset is relevant to the physical asset in a current state and based on a deviation between the mature digital twin from the digital twin as originally received, further identifying whether the proposed change to the physical asset is applicable to the physical asset in the current state; and logging, by the at least one processor, the proposed change to the physical asset.

BRIEF DESCRIPTION OF THE DRAWINGS

FIG. 5b depicts an embodiment of a digital twin representing the physical asset of FIG. 5a.

DETAILED DESCRIPTION

Figure 1:
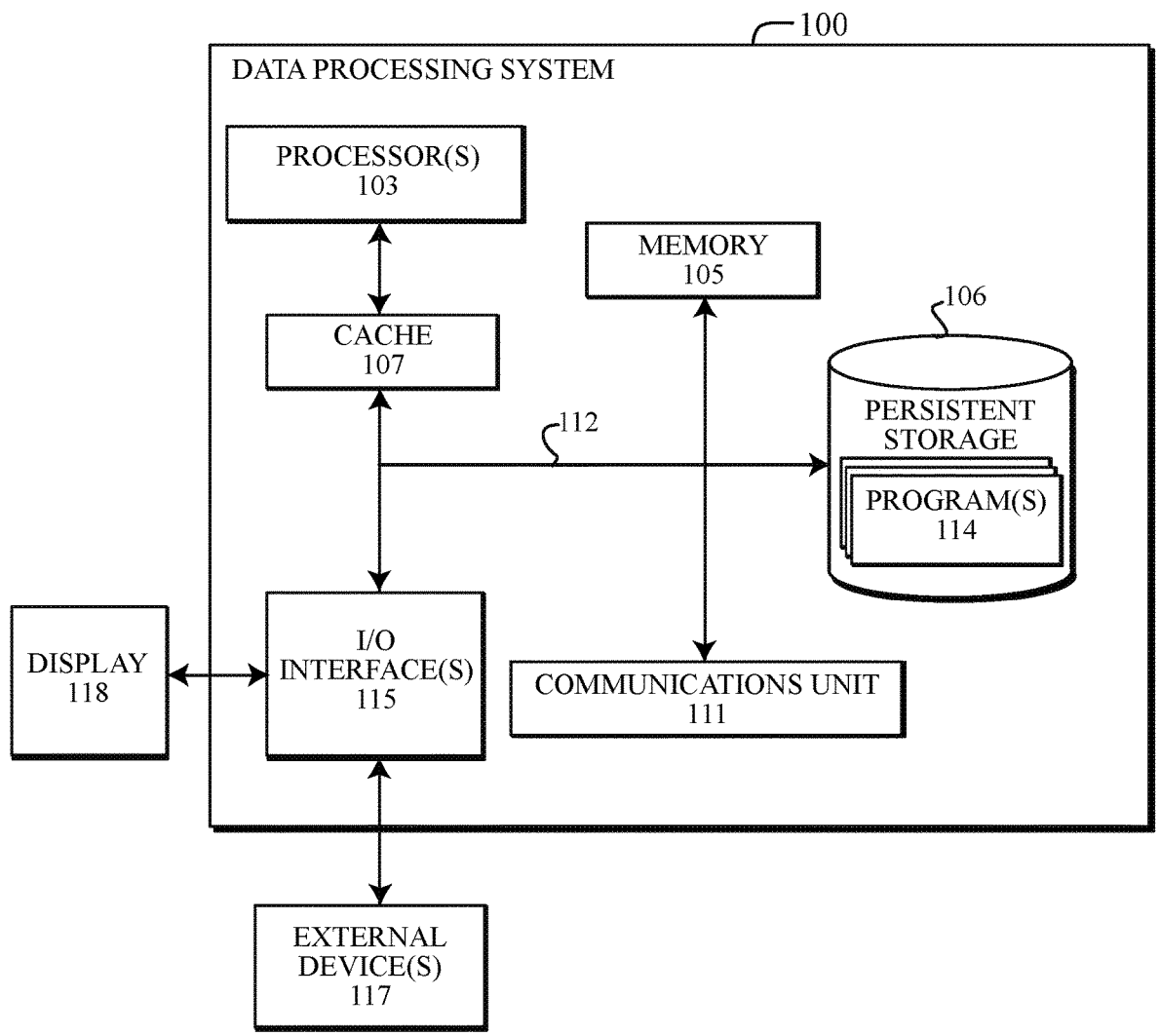
FIG. 1 depicts an embodiment of a block diagram of internal and external components of a data processing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

OVERVIEW

Embodiments of the present disclosure provides systems, methods and computer program products for tracking the evolution and changes to mature digital twins. The term "mature digital twin" may refer to a current state of a digital twin that has aged somewhere between the time the digital twin is initially created to the point wherein the physical asset associated with the mature digital twin is decommissioned. As the mature digital twin evolves over time, the mature digital twin usually changes and differs from the state in which the digital twin was first created (i.e. corresponding to the original state of the base physical asset). Often, manufacturers, sellers, distributors of physical assets, that may be associated with a digital twin, update and/or recommend changes to the physical assets, as necessary or suggested over time. For example, by recommending maintenance, repairs, replacement of parts, recalls, and updating files associated with the digital twin (such as warranties, instruction manuals, etc.) However, as the physical assets change over time, and the mature digital twin changes to reflect or closely match the current state of the physical asset, one or more proposed changes or updates to the physical asset may no longer be relevant. Purchasers of the physical asset may also be maintaining the asset, changing parts, performing repairs and making modifications during the course of ownership. Whether proposed changes remain relevant, may be determined by comparing the original digital twin of the physical asset against the mature digital twin reflecting the physical asset's current state. Embodiments of the present disclosure recognize there is a need for tracking the changes to a physical asset over time using digital twins and leveraging the up-to-date characteristics and data provided by the digital twin's to identify whether subsequent changes proposed by manufacturers, sellers or licensees (hereinafter referred together generally as "sellers") are still relevant to the owner the digital twin.

Embodiments of the present disclosure track changes to the digital twin as the digital twin matures. Over time, mature digital twins can deviate from the original inception of the digital twin created at the time the physical asset is first transferred to the owner, buyer, licensee, etc. (generally referred to herein as "buyers"). For example, changes such as maintenance, repairs, recalls, and even general changes, such as changes to one or more documents and files associated with the digital twin, such as the warranties, manuals, suggested maintenance, etc. As buyers of the digital twin (and the physical asset) receive requests to implement one or more proposed changes, embodiments of the present disclosure can compare and determine whether the proposed changes are still relevant to the mature digital twin. Proposed changes that are still relevant to the mature digital twin can be applied to the physical asset and permeated within the files of the digital twin, while proposed changes that may be considered irrelevant to the current state of the digital twin, may be further analyzed to determine why the changes are irrelevant. For example, the repair, or maintenance on a particular part of the physical asset had been previously performed, or a part that is subject to a recall was previously replaced prior to the recall being issued.

In some embodiments, proposed changes may no longer be relevant due to previous actions performed by the buyers of the physical asset and digital twin. To compensate buyers for performing actions that may reduce costs and/or maintain performance of the physical assets by pre-emptively performing actions that impact the need for the proposed changes, sellers may provide incentives, refunds or other forms of compensation to the owners of the physical asset. For example, as a reward for providing up to date maintenance on the physical asset or for saving the sellers money by avoiding having to schedule and perform recall work on the physical asset. In some embodiments, alerts describing incentives or refunds may be delivered as notifications to client systems in communication with servers or host systems maintaining the digital twin and/or digital twin files. Notifications describing refunds and/or proposed changes may be transmitted to buyers of the digital twin automatically and/or upon detection of qualifying changes that have been applied to the digital twin. In other embodiments, the notification system may alert buyers of proposed changes to the physical asset and/or digital twin and may allow for the buyers and/or authorized parties associated with the digital twin to provide permission to perform proposed changes to the physical asset as well as update the digital twin automatically.

Data Processing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram of a data processing system 100, which may be a simplified example of a computing system capable of performing the computing operations described herein. Data processing system 100 may be representative of the one or more computing systems or devices depicted in the computing environment 200, 260, 300, as shown in FIGS. 2a-8, and in accordance with the embodiments of the present disclosure. It should be appreciated that FIG. 1 provides only an illustration of one implementation of a data processing system 100 and does not imply any limitations with regard to the environments in which different embodiments may be implemented. In general, the components illustrated in FIG. 1 may be representative of any electronic device capable of executing machine-readable program instructions.

While FIG. 1 shows one example of a data processing system 100, a data processing system 100 may take many different forms, both real and virtualized. For example, data processing system 100 can take the form of personal desktop computer systems, laptops, notebooks, tablets, servers, client systems, network devices, network terminals, thin clients, thick clients, kiosks, telephone communication devices (e.g., smartphones), multiprocessor systems, microprocessor-based systems, minicomputer systems, mainframe computer systems, smart devices, or IoT devices 221. The data processing systems 100 can operate in a networked computing environment 200, 260 and/or a distributed cloud computing environment 300, which can include any of the systems or devices described herein and/or additional computing devices or systems known or used by a person of ordinary skill in the art.

Data processing system 100 may include communications fabric 112, which can provide for electronic communications between one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, communications, and network processors, etc.), memory 105, external devices 117, and any other hardware components within a data processing system 100. For example, communications fabric 112 can be implemented as one or more buses.

Memory 105 and persistent storage 106 may be computer-readable storage media. Embodiments of memory 105 may include random access memory (RAM) and cache 107 memory. In general, memory 105 can include any suitable volatile or non-volatile computer-readable storage media and may comprise firmware or other software programmed into the memory 105. Software applications, program(s) 114 and services, such as the digital twin module 203 and digital twin interface 229, described herein, may be stored in memory 105 and/or persistent storage 106 for execution and/or access by one or more of the respective processor(s) 103 of the computer system 100.

Persistent storage 106 may include a plurality of magnetic hard disk drives. Alternatively, or in addition to magnetic hard disk drives, persistent storage 106 can include one or more solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between data processing systems 100. For example, between one or more computer systems or devices via a communication network. In the exemplary embodiment, communications unit 111 may include network adapters or interfaces such as a TCP/IP adapter cards, wireless Wi-Fi interface cards, 3G, 4G, or 5G wireless interface cards or other wired or wireless communication links. Communication networks can comprise, for example, copper wires, optical fibers, wireless transmission, routers, firewalls, switches, gateway computers, edge servers and/or other network hardware which may be part of, or connect to, nodes of the communication networks devices, systems, hosts, terminals or other network computer systems. Software and data used to practice embodiments of the present invention can be downloaded to the computer systems operating in a network environment through communications unit 111 (e.g., via the Internet, a local area network or other wide area networks). From communications unit 111, the software and the data of program(s) 114 can be loaded into persistent storage 106.

One or more I/O interfaces 115 may allow for input and output of data with other devices that may be connected to data processing system 100. For example, I/O interface 115 can provide a connection to one or more external devices 117 such as one or more smart devices, IoT devices 221, recording devices such as an audio system, camera systems, one or more sensor device(s) 219, input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, a computer monitor or screen. Human-readable display 118 can also be an incorporated display and may function as a touch screen, such as a built-in display of a tablet computer.

System for Tracking the Maturation of Digital Twins

Referring to the drawings, FIGS. 2a-8 depict an approach that can be executed using one or more data processing systems 100 operating within a computing environment 200, 260, 300 to implement systems, methods and computer program products for tracking the maturation of digital twins and selectively applying proposed changes to digital twins that may be relevant, even as the digital twin changes or evolves over time (referred to herein as a "mature digital twin"). Embodiments of computing environments 200, 260, 300 may include one or more data processing systems 100 interconnected via a device network 250. The data processing systems 100 connected to the device network 250 may be specialized systems or devices that may include, but are not limited to, the interconnection of one or more host system 201, physical asset 217 which may comprise one or more sensor device(s) 219 and/or IoT device(s) 221, a network-accessible repository 231 and at least one client system 227.

The data processing systems 100 exemplified in FIGS. 2a-8, may not only comprise the elements of the systems and devices depicted in the drawings of FIGS. 2a-8, but these specialized data processing systems depicted may further incorporate one or more elements of a data processing system 100 shown in FIG. 1, and described above. Although not shown in the figures, one or more elements of the data processing system 100 may be integrated into the embodiments of host system 201, physical asset 217, sensor device(s) 219, IoT device(s) 221, computing systems that are hosting repository 231, and client systems 227, including (but not limited to) the integration of one or more processor(s) 103, program(s) 114, memory 105, persistent storage 106, cache 107, communications unit 111, input/output (I/O) interface(s) 115, external device(s) 117 and human-readable display 118.

Embodiments of the host system 201, physical asset 217, client system 227, repository 231 and other data processing systems 100, may be placed into communication with one another via computer network 250. Embodiments of network 250 may be constructed using wired, wireless or fiber-optic connections. Embodiments of the host system 201, physical asset 217, client system 227, repository 231 and other data processing systems 100, may connect and communicate over the network 250 via a communications unit 111, such as a network interface controller, network interface card or other network communication device capable of facilitating a connection with network 250. In some embodiments of computing environments 200, 260, 300, one or more host system 201, physical asset 217, client system 227, or repository 231, may represent data processing systems 100 utilizing clustered computers and components acting as a single pool of seamless resources when accessed through network 250. For example, such embodiments can be used in a data center, cloud computing, storage area network (SAN), and network-attached storage (NAS) applications.

Embodiments of the communications unit 111 may implement specialized electronic circuitry, allowing for communication using a specific physical layer and a data link layer standard. For example, Ethernet, Fiber channel, Wi-Fi or Token Ring to transmit data between the host system 201, physical asset 217 client system 227, repository 231 and other data processing systems 100 connected to network 250. Communications unit 111 may further allow for a full network protocol stack, enabling communication over network 250 to groups of host systems 201, physical assets 217 client systems 227, repository 231 and other data processing systems 100 linked together through communication channels of network 250. Network 250 may facilitate communication and resource sharing among the host system 201, physical asset 217 client system 227, repository 231 and other data processing systems 100 (for example, network-accessible storage media) connected to the network 250. Examples of network 250 may include a local area network (LAN), home area network (HAN), wide area network (WAN), backbone networks (BBN), peer to peer networks (P2P), campus networks, enterprise networks, the Internet, cloud computing networks and any other network known by a person skilled in the art.

Cloud computing networks are a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 300 is service-oriented with a focus on statelessness, low coupling, modularity, and semantic interoperability. At the heart of cloud computing is an infrastructure that includes a network 250 of interconnected nodes 310.

Figure 3:
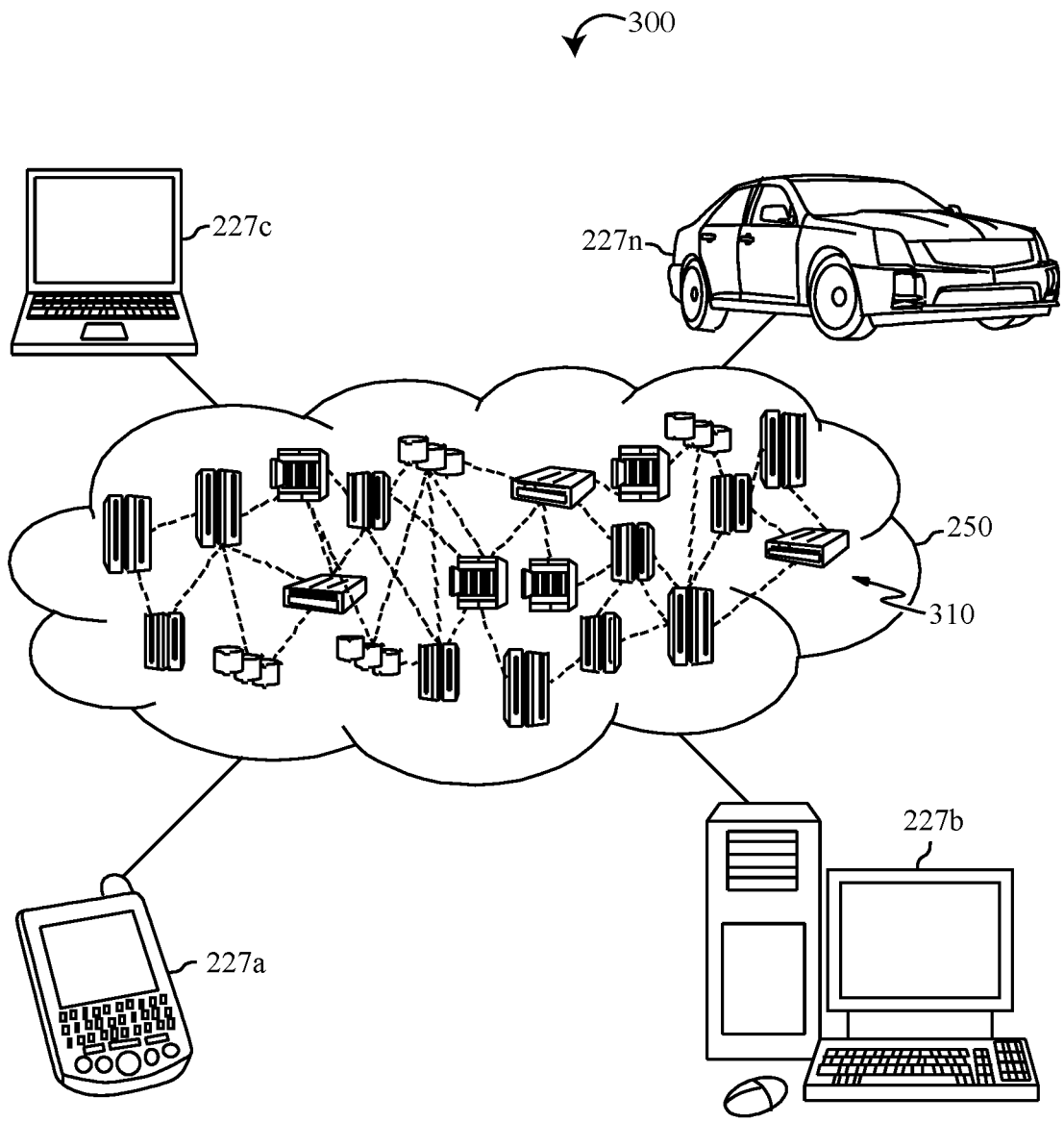
FIG. 3 depicts an embodiment of a cloud computing environment within which embodiments described herein may be implemented in accordance with the present disclosure.

Referring to the drawings, FIG. 3 is an illustrative example of a cloud computing environment 300. As shown, cloud computing environment 300 includes one or more cloud computing nodes 310 with which client systems 227 operated by the cloud consumers, may communicate with the cloud computing environment 300. For example, client systems 227a, 227b, 227c, 227n as illustrated in FIG. 3. Nodes 310 of the cloud computing environment 300 may communicate with one another and may be grouped (not shown) physically or virtually, in one or more networks, such as Private, Community, Public, or Hybrid clouds as described hereinabove, or a combination thereof. This may allow the cloud computing environment 300 to offer infrastructure, platforms and/or software as services for which a cloud consumer does not need to maintain resources on a client system 227. It is understood that the types of client systems 227 connected to the cloud computing environment 300, are intended to be illustrative only and that computing nodes 310 of the cloud computing environment 300 can communicate with any type of computerized device over any type of network and/or network addressable connection (e.g., using a web browser).

Figure 4:
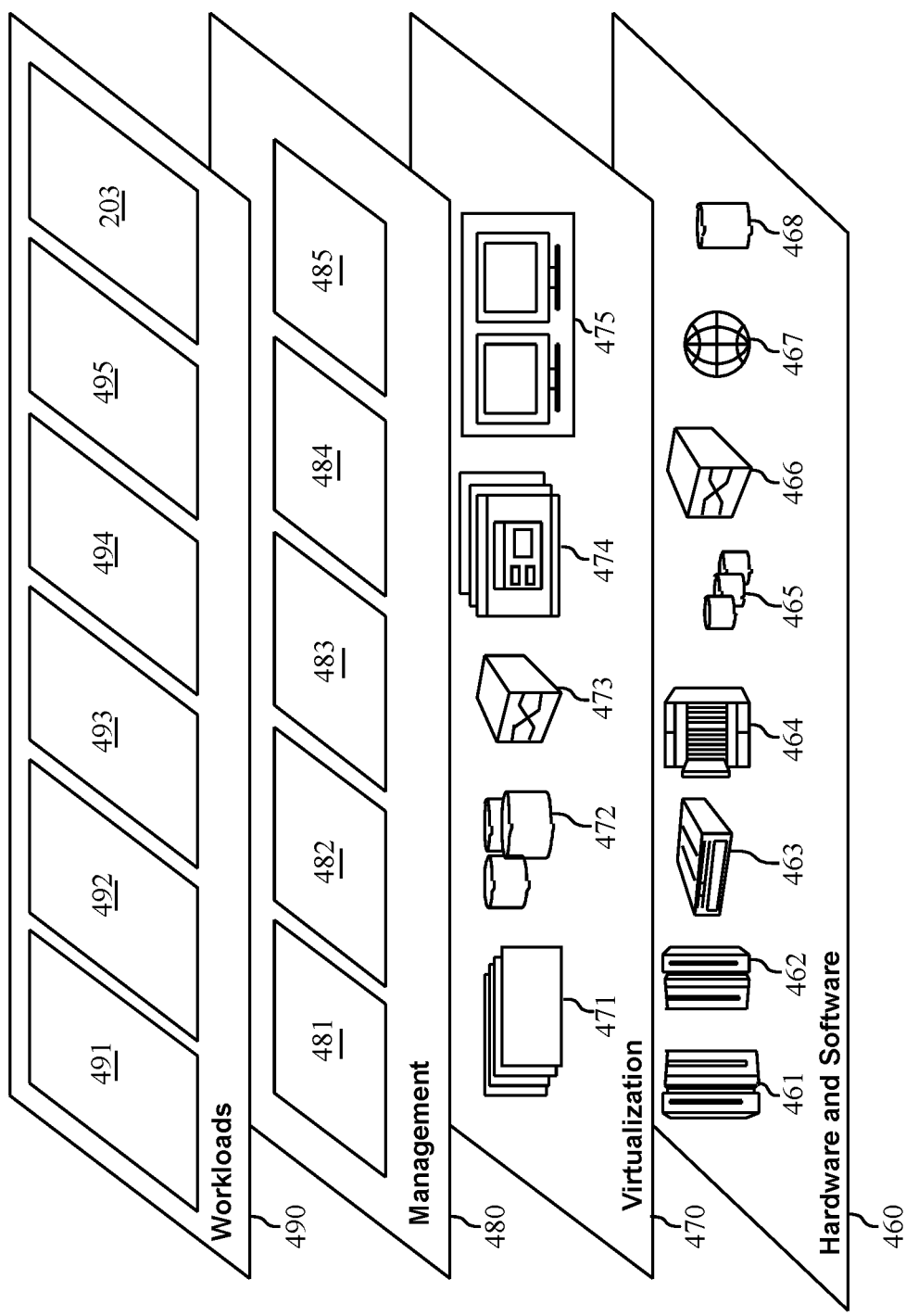
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include mapping and navigation 491, software development and lifecycle management 492, virtual classroom education delivery 493, data analytics processing 494, transaction processing 495, and digital twin services provided by digital twin module 203.

Figure 2A:
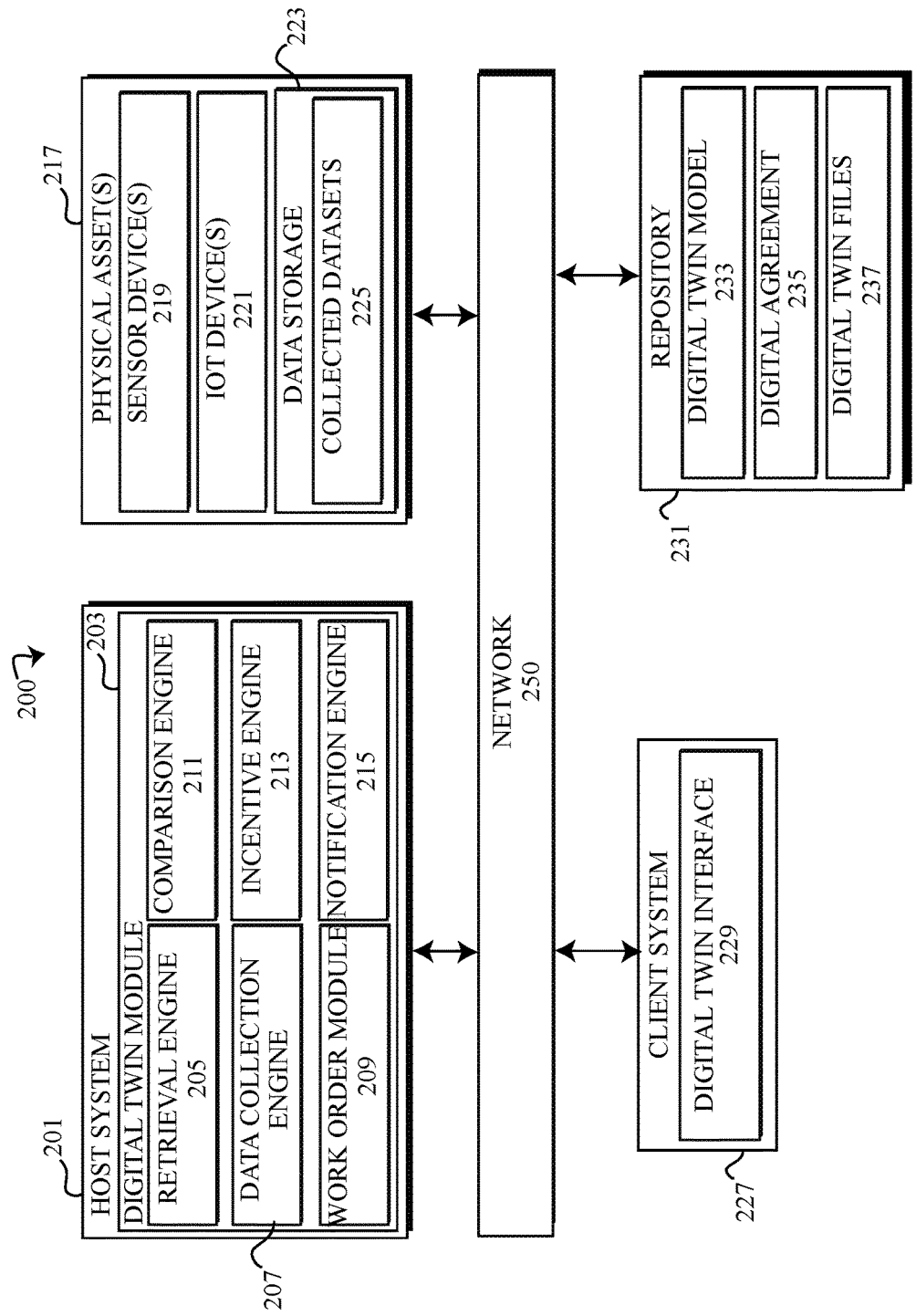
FIG. 2a depicts a block diagram of an embodiment of a computing environment for tracking the maturation of a digital twin over the lifespan of digital twin and the associated physical asset.

Referring back to the drawings of FIG. 2a, FIG. 2a depicts an embodiment of a computing environment 200 capable of tracking the evolution of mature digital twins and permeating relevant updates applicable to mature digital twins automatically or as selected by owners of the digital twin. Embodiments of computing environment 200 feature a device network 250 connected to a plurality of specialized data processing systems 100, including a host system 201, physical asset(s) 217, which may include one or more sensor device(s) 219 and/or IoT Device(s) 221, client system 227 and repository 231. The data processing systems 100 of the computing environment 200 depicted, may comprise specialized configurations of hardware, software or a combination thereof, as shown and described herein, including specialized modules for implementing one or more particular tasks, functions or operations associated with tracking mature digital twins and permeating relevant updates thereto. The term "module" may refer to a hardware module, software module, or a module may be a combination of hardware and software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one of the data processing systems 100 operating as part of the computing environment 200. For example, the digital twin module 203 depicted in FIG. 2a loaded into the memory 105 or persistent storage 106 of host system 201.

As shown in the exemplary embodiment of FIG. 2a, embodiments of the computing environment 200 may include a host system 201. The host system 201 may be a computer system or another type data processing system 100 connected to network 250, which can provide services to other systems or users connected to the network 250. As shown in FIG. 2a, the host system 201 may provide digital twin services via the digital twin module 203. The digital twin services may be provided to owners, purchasers, licensees, manufacturers, sellers, licensors and other authorized users (collectively referred to generally as "users") of the digital twins being accessed. Users may connect to the host system 201 and access the services of the digital twin module 203 via one or more client systems 227. Embodiments of the host system 201 may execute program code of the digital twin module 203 to perform one or more functions or operations of the digital twin module 203, including, but not limited to retrieving and updating digital twin models 233, digital agreements 235, and digital twin files 237, aggregating and organizing data generated by sensor device(s) 219 or IoT devices 221 of the physical asset(s) 217, simulating changes to the digital twin, identifying potential changes to the digital twin, managing proposed change requests, comparing digital twins of an original state or subsequent state with mature digital twins in a current state, determining whether proposed change requests are applicable to the mature digital twin, scheduling implementation of proposed changes, and notifying owners or authorized individuals of the implemented change(s) to the digital twin. One or more individual functions or features of the digital twin module 203 may be implemented by one or more subsets or sub-modules of the digital twin module 203. For example, the exemplary embodiment of the digital twin module 203, depicts a retrieval engine 205, data collection engine 207, work order module 209, comparison engine 211, incentive engine 213, and/or notification engine 215.

Embodiments of the retrieval engine 205, may perform functions, tasks or operations associated with retrieving and updating files stored by a repository 231. Repository 231 may store files associated with the creation and ongoing updates to digital twins and/or mature digital twins. Storage provided by the repository 231 may be integrated into the host system 201 in some embodiments, while in other embodiments, the storage of the repository 231 may be remotely accessed over network 250. As shown in the embodiment of FIG. 2a, the repository may store one or more digital twin models 233, digital agreements 235 and digital twin files 237. Digital twin model 233 may include visual content and images depicting the physical asset 217. For example, as a 3d model or CAD drawing. Digital twin models 233 can be tracked over multiple points in time and states of the physical asset 217. For example, an iteration of the digital twin can be stored as a 3d model or CAD drawing at the original point of creation of the digital twin depicting the originally received physical asset 217 (the "base asset"). A new iteration of the digital twin model 233 may be created and stored every time the physical asset 217 is modified and such change is permeated to the associated digital twin. A user accessing the digital twin models 233 may be able to view an entire timeline of models or drawings depicting the digital twin as the digital twin matures over time, creating a series of digital twin models 233 representing the evolution of the digital twin (and physical asset 217) at various timepoints over the lifetime of the physical asset 217.

Figure 5A:
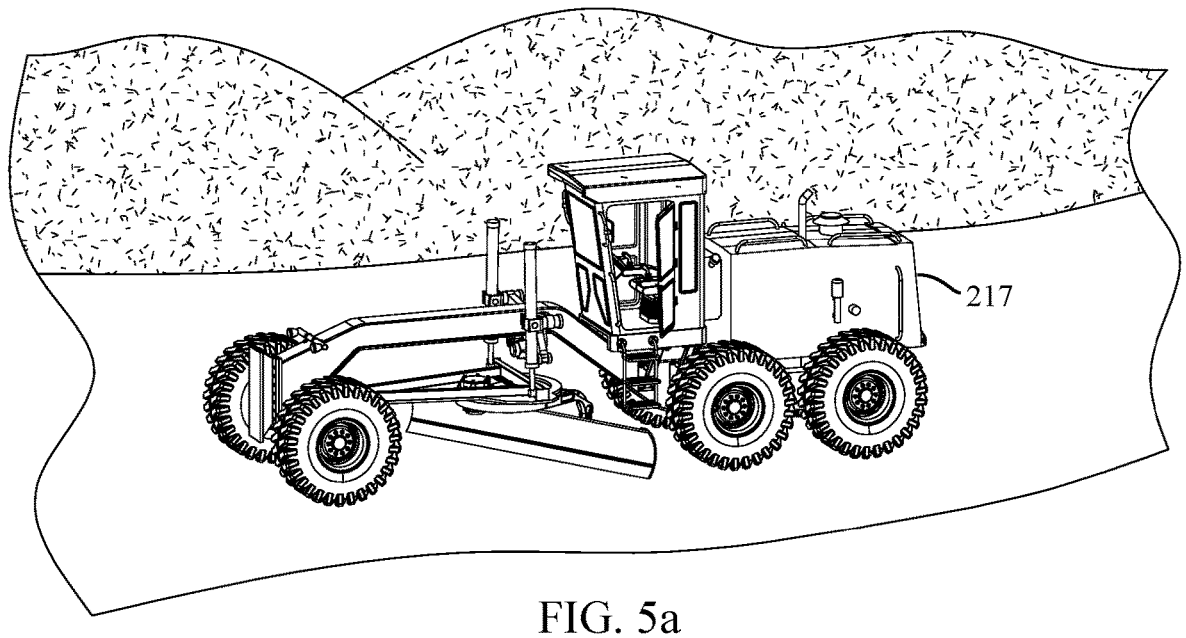
FIG. 5a depicts an embodiment of a physical asset operating in physical space, in accordance with the present disclosure.
Figure 5B:
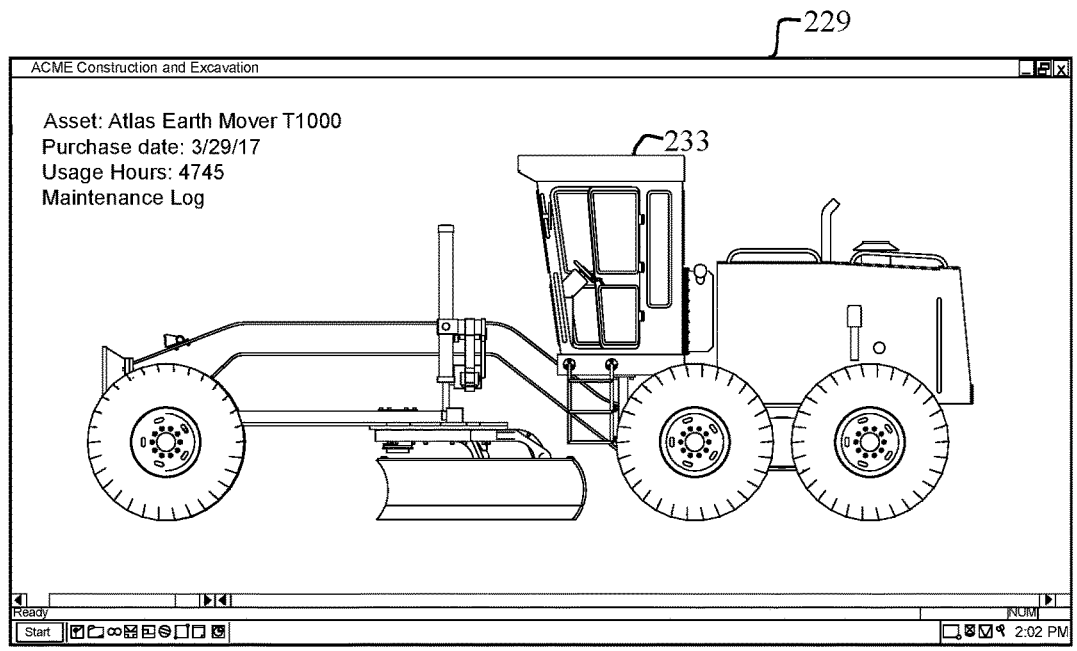
Figure 6A:
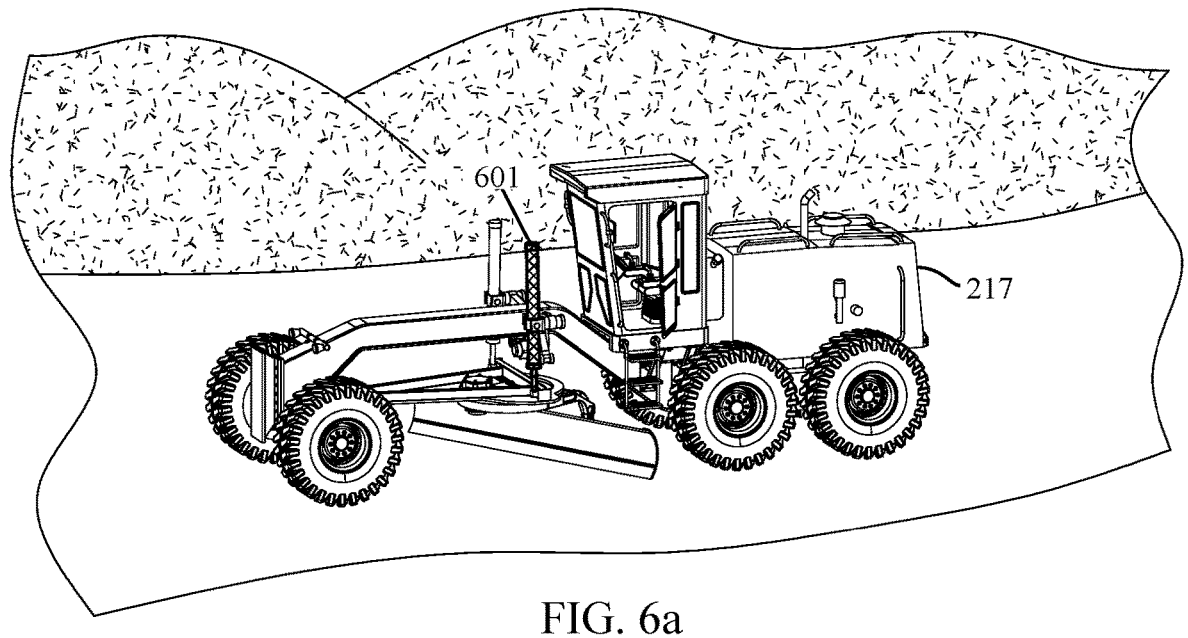
FIG. 6a depicts an illustration of an embodiment of a mature physical asset, in accordance with the present disclosure.
Figure 6B:
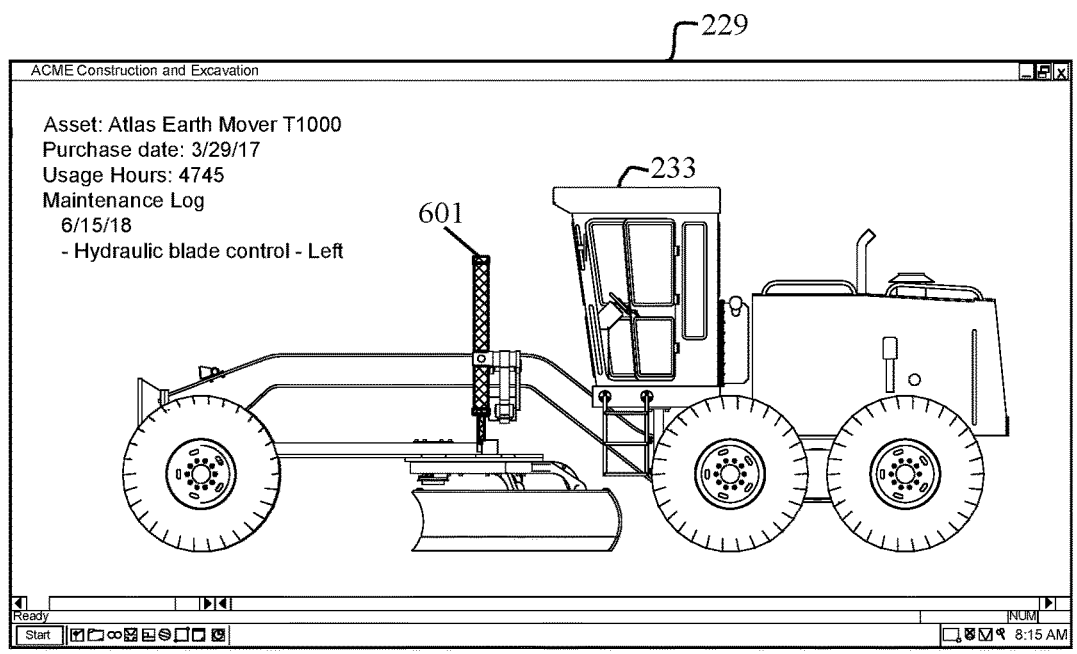
FIG. 6b depicts an illustration of an embodiment of a mature digital twin of the mature physical asset of FIG. 6b.

For example, as shown in FIGS. 5a-5b, a digital twin model 233 depicted in FIG. 5b can be continuously updated to accurately depict physical asset 217 shown in FIG. 5a. The digital twin model 233 may be displayed on a human-readable interface, such as the digital twin interface 229 and provide one or more details describing the digital twin model 233 or the asset 217 being depicted, including make, model, purchase date, amount of time the physical asset has been used, etc. Embodiments of the digital twin model 233 can change to reflect the status of the physical asset (in real-time, or near real-time in some embodiments). FIG. 6a depicts a mature physical asset 217 which has received one or more replacement parts 601 or maintenance that differ from the base physical asset 217 depicted in FIG. 5a. For example, as shown by the example in FIG. 6a, a replacement part 601 has replaced one of the hydraulic blade control components depicted in FIG. 5a. The Example of FIG. 6b depicts a mature digital twin depicting a digital twin model 233 reflecting the replacement of the replacement part 601 and may include additional details logging the replacement part 601 installed, the name of the replacement part 601 installed, the date and/or time the replacement occurred or additional details describing the replacement process. As noted above, the repository 231 may store multiple versions of the digital twin models 233 as the digital twin changes over time. Using FIG. 5b and FIG. 6b as an example, the repository 231 may store the digital twin model 231 depicted in FIG. 5b as a separate version from the digital twin model 233 depicted in FIG. 6b. Accordingly, a user accessing the digital twin models 233 can view both the digital twin models 233 and identify how the physical asset 217 has changed over time, as depicted by the changes to the versions of the digital twin models 233 stored by the repository 231.

Embodiments of the repository 231 may store one or more digital agreements 235, as shown in FIG. 2a. The digital agreement 235 may be a digitized contract or agreement, agreed upon between the buyer (or licensee) of the physical asset 217 and the manufacturer, seller or licensor providing the physical asset 217. Embodiments of digital agreements 235 may specify terms of the contract and conditions upon which the contract will be considered satisfied for the purposes of initiating the creation of the digital twin and permitting access to the digital twin model 233 or digital twin files 237. For example, embodiments of the digital agreement 235 can specify terms of the contract, such as the length of time the digital twin and the associated digital twin models 233 and/or digital twin files 237 will remain accessible (i.e. 5, 10, 20, 30 years, etc.), and terms describing ownership change and procedures defined by the digital agreement 235. Moreover, the terms of the digital agreement 235 may include conditions describing the initial files that may be required to be deposited into the repository 231 by the manufacturer, seller or licensee, in order to satisfy the digital twin requirements of the digital agreement 235. The initial files (along with any additional files and/or updates to the initial files) may be stored as digital twin files 237. Examples of digital twin files 237 that may be deposited in the repository 231, may include (but are not limited to) user manuals, operation manuals, bill of materials, warranties, maintenance plans or maintenance schedules, specifications of the physical asset 217, specifications of IoT devices 221 and sensor devices 219, logs of physical asset 217 performance, logs of physical asset device readings, fault codes, ownership history, and documents effectuating a change in ownership of the physical asset 217, augmented reality or virtual reality instructions, artificial intelligence or machine learning models and media resources. In some embodiments, the digital agreement 235 may specify the standards and/or formats of the digital twin files 237 being deposited in the repository 231.

A user accessing the host system 201 via a client system 227, may interface with the host system 201 through the use of a digital twin interface 229 in order to input requests to access, update and/or upload files to repository 231. A user may input one or more requests or commands to the digital twin module 203, requesting to retrieve, edit and/or update files stored by the repository 231. Requests or commands inputted by the client system 227, may direct the retrieval engine 205 to query the repository 231 for the requested digital twin model 233, digital twin agreement 235 and/or digital twin files 237 stored therein. FIGS. 5b, 6b, 7 and 8 provide examples of digital twin models 233, and notifications 801 being displayed by the digital twin interface 229. The user accessing the digital twin module 203 from the client system 227 may edit, update, and/or replace the retrieved files as needed via the digital twin interface 229. In some embodiments, the user may be the owner or licensee of the physical asset 217 or an authorized individual associated with the owner. In other embodiments, the user accessing the digital twin may be a manufacturer, seller or licensor of the physical asset 217. The manufacturer, seller or licensor may be accessing the repository for the purpose of updating or providing the original digital twin model 233 of the base physical asset 217, digital agreement 235, one or more digital twin files 237 and/or communicating one or more proposed changes to active digital twins that are subject to the terms and conditions of an implemented digital agreement 235.

Embodiments of the digital twin module 203 may comprise a data collection engine 207. The data collection engine 207 may perform the functions, tasks or operations associated with collecting, organizing, maintaining, formatting and/or storing performance data and other data sets (collectively referred to as "collected datasets 225") generated by the sensor device(s) 219 and/or IoT device(s) 221 connected to the physical asset 217. The collected datasets 225 generated by the sensor device(s) 219 and/or IoT device(s) 221 of the physical asset 217, may be stored to one or more data storage 223 solutions, which may be part of one or more data processing systems 100 onboard the physical asset 217 in some embodiments. In other embodiments, the data storage 223 maintaining the collected datasets 225 may be distributed across the network 250 and/or stored by one or more networked-connected data storage systems (not shown).

During operation of the physical asset 217, sensor devices 219 and IoT devices 221 equipped by the physical asset 217 can generate data describing the operation, functionality and performance of the physical asset 217. The collected datasets 225 that are generated by the sensor devices 219 and IoT devices 221, can describe the overall health and performance of the physical asset 217 in its current state, help diagnose potential maintenance needs, repairs or failing parts that may need replacement. Embodiments of the sensor devices 219 and IoT devices 221 integrated into the physical asset 217 can also provide error or diagnostic codes, which may further assist with identifying potential issues, that may alert the user or owner of pending problems with physical asset 217. Through the use of the collected datasets 225, organized, analyzed and/or formatted by the data collection engine 207, the digital twin module 203 may analyze the physical asset's 217 performance, identify failing parts, provide resolutions to cure errors or diagnostic codes and recommend optimal actions to improve or optimize performance of the physical asset 217.

Embodiments of the digital twin module 203 may further use the collected data to simulate physical asset 217 performance within the digital twin or provide simulations using various scenarios of the digital twin to predict results for performing changes to the digital twin's configuration. For example, simulations predicting effects of replacing particular parts, adjusting timings, modifying onboard electrical or computing components or even replacing potentially defective sensors 219 or IoT devices 221. Simulations performed using the performance data received by the data collection engine 207 may be stored in the repository 231, as one or more digital twin files 237. For example, as a log of the performance data. In some embodiments, the digital twin module 203 may create simulated digital twin models 233 using the collected datasets 225 and simulation data to create an instance of the digital twin that may have improved or optimized performance over the current state of the mature digital twin and physical asset 217 currently implemented. In some embodiments, manufacturers and/or sellers of the physical asset 217 may access the collected datasets 225, simulation data and/or files prepared by the data collection engine 207 to identify potential changes that may improve or cure performance issues relating to the physical asset 217, based on the data accessible via the digital twin.

In some embodiments, proposed changes to the digital twin may be proffered by the manufacturer, licensor or seller, based on aggregated data collected by the digital twin module 203 for the digital twin(s) derived from a common base asset. For example, manufacturers, licensors or sellers of a particular model of a mining truck (the base asset) may collect digital twin data and performance data collected by the mining truck. Even though purchasers of the mining truck may have modified one or more parts of the mining truck, the purchaser(s) started off with the same base asset (or similar models thereof that may have parts in common) as originally provided. Based on the aggregate of performance data and digital twin data made accessible across a plurality of purchasers, the manufacturer, licensor or seller of the mining truck (or other assets) can identify commonly replaced or faulty equipment parts, identify proper maintenance routines that keep the equipment properly running within the desired specifications, potential parts that should be recalled and make proposed changes to the physical asset 217, through the digital twin module 203.

Embodiments of the digital twin module 203 may comprise a work order module 209. The work order module 209 may perform functions or tasks related to initiating a proposed change or change request by a manufacturer, licensor or seller of the physical asset 217. A manufacturer, licensor or seller accessing the digital twin module 203 may propose a work order for implementing a general or specific change to one or more physical assets 217 using the digital twins associated with the physical asset for guidance on determining which physical assets 217 are potentially eligible for receiving the proposed change. Examples of proposed specific changes can include (but are not limited to) performance of maintenance, repairs, recalls, part replacements, installation or removal of parts or components, software or firmware updates, timing adjustments, sensor device 219 or IoT device 221 configuration, etc. Examples of general changes on the other hand may include (but are not limited to) revising or updating digital twin files 237 such as user manuals, warranty information, operation manuals, altering recommended maintenance schedules, revising fault codes or adding new fault codes, modifying ownership information such as contact info and/or changing ownership entirely, etc.

A manufacturer, licensor or seller may transmit a proposed change, which may define criteria that filters digital twins that may qualify for implementing the proposed change from a pool of existing digital twins. For example, an owner or seller proposing the implementation of a change can define the change as being applicable to all digital twins originally derived from a particular model of a base asset. For instance, by defining the proposed change as being applicable to particular brands or model(s) of a mining truck. Even more specifically, the manufacturer, licensor or seller may further define applicability of the proposed change to base assets that were originally configured with a particular part that may now need repair, maintenance or replacement. For example, by further defining a series of serial numbers associated with a time frame when a base asset may have been manufactured with the part now being proposed by the change. Embodiments of the work order module 209 may query the repository 231 for digital twin models 233 which are originally derived and/or comprise the defining criteria being queried by the manufacturer or seller. The results of the query can be returned to the digital twin interface 229 and may describe the owner, physical asset 217 and digital twin that the proposed change may be applicable to.

Embodiments of the digital twin module 203 may comprise a comparison engine 211. The comparison engine 211 may perform the task, function or operation of analyzing the proposed changes requested by the work order module 209 for the selected groups of digital twins that may be eligible to receive the proposed change and determine whether the proposed changes are relevant or applicable to the physical asset 217. The determination is based on the mature digital twin representing the physical asset 217 in the physical asset's 217 current state and whether the proposed base asset change is still relevant to the mature twin that is derived from the base asset.

For example, a base asset for a mining truck equipped with a particular hydraulic pump is proposed for a recall by the manufacturer due to data suggesting repeated failure of the hydraulic pump within the warranty period. An owner of a mining truck that was originally provided the base asset has undergone part replacements over the lifetime of the mining truck, including replacement of the hydraulic pump with a new model or design. The removal and change of the hydraulic pump for the mining truck has been tracked and reflected in the mature digital twin. The comparison engine 211, analyzes the mature digital twin of the mining truck in the current state to determine whether the proposed recall of the original hydraulic pump for the mining truck is a change that is relevant. The comparison engine 211 identifies, based on the mature digital twin, that the hydraulic pump that is subject to the recall defined by the proposed change, is no longer present in the mining truck and has been removed previously by the owner of the physical asset 217. Accordingly, the comparison engine 211 may remove the mining truck that contains the replacement pump from the group of mining trucks that will be proposed the recall, since the recall is not applicable. Conversely, in an example, where the mature digital twin reflects a series of replaced parts that are outside of the specifications of the base asset, but the mature digital twin still depicts the inclusion of the original hydraulic pump subject to the proposed recall, the comparison engine 211 may identify the proposed recall as still relevant to the mining truck of this example and proceed with recommending the proposed change or scheduling the implementation of the recall and permeating the proposed change to the mature digital twin automatically upon conclusion of the recall performed on the physical asset 217.

Embodiments of the comparison engine 211 may analyze the proposed change inputted into the work order module 209 and determine whether or not the proposed change is relevant toward a change to a specific part or component (a "specific change") of the physical asset 217, or a general change that may be applicable to all digital twins derived from the same base asset. Proposed changes, that are considered general changes, may be evaluated by the comparison engine 211 against the mature digital twin, to determine whether the proposed change would override or conflict with historical experiences of the physical asset 217 over the course of the physical asset's 217 lifetime up to the current state. Proposed general changes that do not conflict or override the past experiences, as documented by the mature digital twin, may be accepted and permeated to the mature digital twin. Conversely, general changes that would conflict or override past experiences documented by the changes over time to the mature digital twin, may be rejected in some embodiments and/or proposed to the owner of the mature digital twin, allowing for the owner to manually select whether to implement the proposed general change.

Embodiments of the comparison engine 211 that receive a proposed change from the work order module 209 that may be classified as a specific change, may be further evaluated by the comparison engine 211 to determine if 1) a deviation has occurred between the digital twin of the base asset and the mature digital twin depicting the physical asset in the current state; and 2) if such a deviation has occurred, is the proposed specific change, still relevant to the mature digital twin in the mature digital twin's current state? Deviations may be considered to have occurred where parts, components, features, software or other components of the digital twin as originally delivered to the owner or buyer of the physical asset 217 differ from the parts, components, features, software or other components of the mature digital twin in the current state of the physical asset 217.

In embodiments where the comparison engine 211 has determined that deviations have occurred between the digital twin originally provided to the owner and the mature digital twin depicting the physical asset's 217 present state, and those deviations render the proposed change as not being relevant (for example, because the part proposed to be recalled, replaced or repaired has previously been replaced or repaired), the comparison engine 211 may engage the digital twin module 203 to respond accordingly, by preventing the proposed change from being implemented onto the mature digital twin and/or the physical asset 217. The comparison engine 211 may ignore the proposed change due to the change being irrelevant and thus no further action being necessary. In other embodiments, the comparison engine 211 may respond by engaging the incentive engine 213 or engaging the notification engine 215 to perform one or more tasks, functions or operations. For example, engaging the notification engine 215 to further alert the owner of the mature digital twin of the irrelevant proposed change and/or engage the incentive engine 213 to lookup the availability of one or more refunds, incentives or compensation that may be available to the owner for previous changes to the digital twin that rendered the proposed change to be irrelevant in the present state. In some embodiments, notifications from the notification engine 215 may transmitted or logged with an enterprise asset management software, which may schedule or create workorders for implementing the proposed changes. In some instances, the asset management software may automate the implementation of proposed changes without having to involve owner approval or involvement.

In embodiments of the comparison engine 211, wherein the comparison engine 211 analyzes digital twins against the mature digital twin representing the physical asset 217 in its current state, and determines that the proposed change to the mature digital twin is still relevant to the mature digital twin, despite deviations that may have occurred from the original base asset, the comparison engine 211 may perform one or more actions relevant to permeating the proposed change to the physical asset 217. For instance, the comparison engine 211 may instruct the work order module 209 to proceed with scheduling the performance and implementation of the proposed changes automatically and apply the proposed changed to be reflected by the mature digital twin. In other instances, the comparison engine 211 may engage the notification engine 215 to alert the owner of the proposed changes and receive input from the owner confirming that the application of the proposed changes are acceptable to be applied to the mature digital twin and physical asset 217. In some embodiments, rather than receiving a confirmation from the owner to move forward with the proposed changes, the work order module 209 may automatically apply the proposed change and the notification engine 215 may alert the owner of the physical asset 217 that the changes have been applied and/or reflected in the mature digital twin. Moreover, where the comparison engine 211 determines that no deviations have occurred between the digital twin as originally provided to the owner and the mature digital twin representing the physical asset 217 in the current state, the work order module 209 may schedule the proposed change to be applied to the physical asset 217 and concurrently reflected by the mature digital twin.

Figure 7:
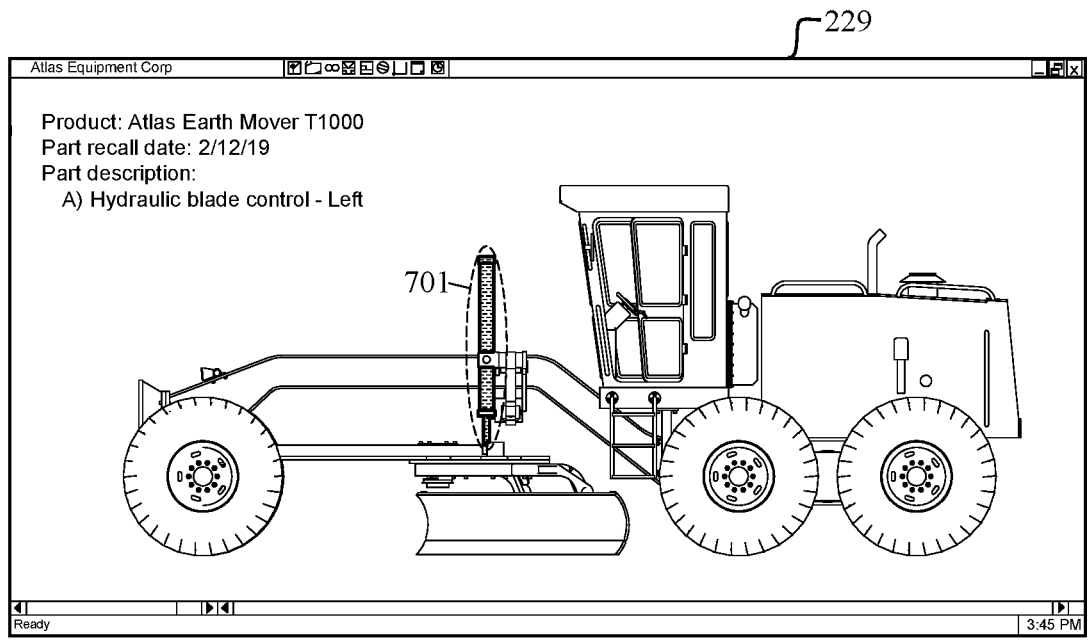
FIG. 7 depicts an illustration of an embodiment of a mature digital twin receiving a proposed base asset change in accordance with the present disclosure
Figure 7:
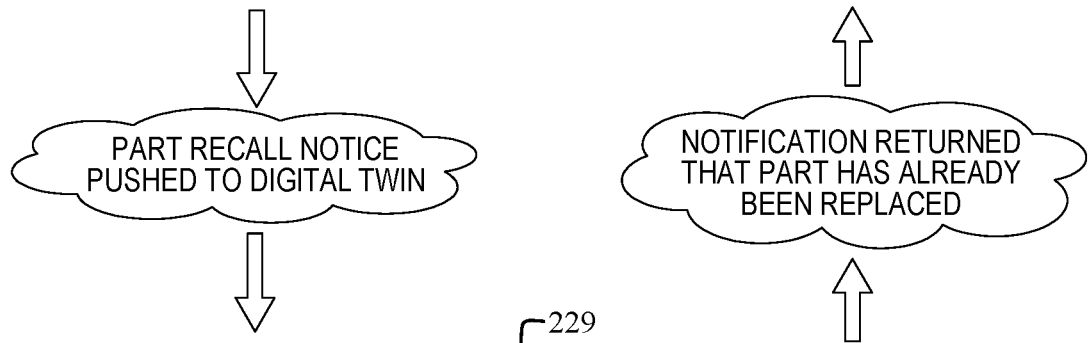
Figure 7:
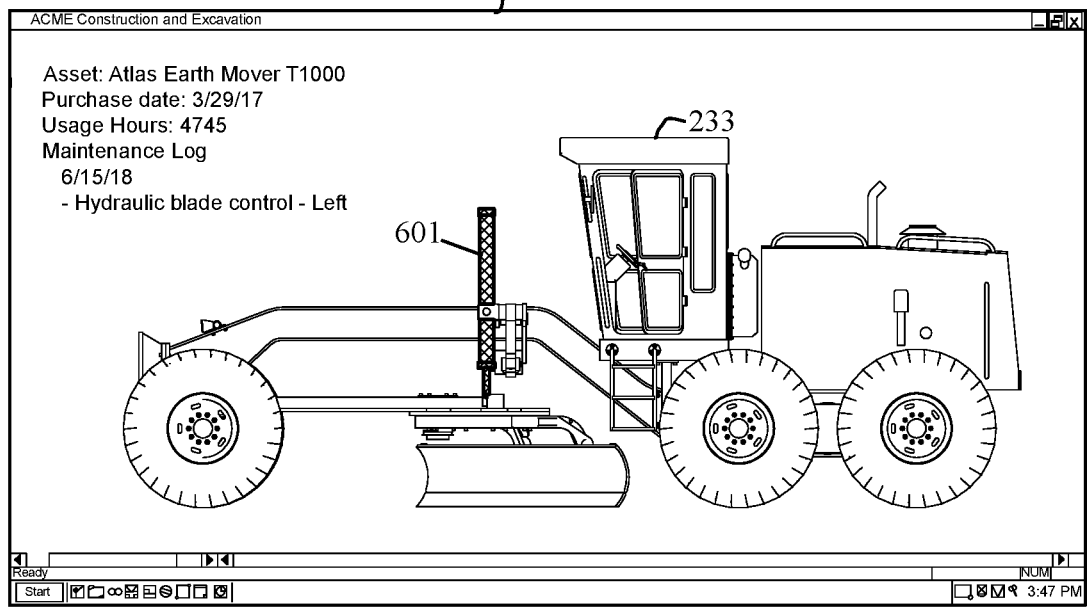

FIG. 7 depicts an example of a proposed change proffered by a manufacturer of the physical asset 217 depicted. As shown in the example, the manufacturer presents a proposed recall of the hydraulic blade control component of the base asset (depicted in the digital twin model 233 of FIG. 5*b*) with a hydraulic blade control component 701. As shown, the proposed recall may be pushed to the digital twin, wherein the comparison engine 211 may determine whether or not the recall is applicable to the mature digital twin in the digital twin's current state. In this example, upon comparison of the mature digital twin model 233 of FIG. 7 with the proposed recall of the base asset with the component 701, the comparison engine 211 determines that the recall is not applicable because the base asset component was previously replaced with replacement part 601 as shown.

Embodiments of the incentive engine 213 may perform the task, function or operation of finding and calculating rebates, refunds and/or incentives that may be provided as compensation to owners of the mature digital twin and physical asset 217, in exchange for the owner's previously performed changes to the physical asset 217 that render the proposed changes irrelevant. For example, the owner replacing or repairing brakes on a vehicle prior to regularly scheduled maintenance for performing the brake removal and replacement. The incentive engine 213 may search one or more databases, records or other data sources, such as repository 231 for information that evidences costs associated with the prior changes to the mature digital twin. For instance, receipts or bills of sale describing the services performed. Using the example of brake maintenance being performed on the physical asset 217 prior to the regularly scheduled maintenance, the owner of the physical asset 217 may upload receipts or bills of sale to the repository 231 describing the maintenance performed and costs associated with performing the maintenance. The incentive engine 213 may calculate a proposed refund, reimbursement or added incentive to the owner, such as monetary compensation to refund the costs to the owner of the physical asset 217 in their entirety or a portion of the costs, as agreed upon by the owner and manufacturer, seller or licensor. Compensation provided by the inventive engine 213 may be a 1:1 dollar for dollar reimbursement, a certain percentage of the costs incurred by owner, a flat fee, or any other reward or value that may have been agreed upon or described in the digital agreement 235. In some embodiments, owners of the physical asset 217 and manufacturers, sellers or licensors may link bank accounts to the to the digital twin module 203. The incentive engine 213 may access the bank account information and automatically transfer funds between the linked bank accounts, where appropriate, for providing refunds, compensation or other incentives to the owners of the physical asset 217.

Embodiments of the notification engine 215 may perform functions, tasks or operations associated with alerting or sending notification messages between the host system 201 and client system 227. The notifications or alerts generated and displayed by the notification engine 215 may keep owners and manufacturers aware of the implementation and/or approvals of proposed changes, allow for users to provide consent or confirm acceptance of proposed changes and/or maintain awareness of modifications or updates to files stored by the repository 231. Moreover, prior to the creation of the digital twin and implementation of the digital agreement 235, the notification engine 215 may provide an avenue for buyer and seller to communicate about terms of the digital agreement 235 and alert buyers and sellers of the physical asset 217 when the digital agreement 235 has been initiated, fulfilled, and/or expires. Notifications may be displayed by the digital twin interface 229 as part of a graphical user interface displaying messages to the user of the client system 227 and/or providing opportunities for users receiving the notifications to input responses or feedback to the received notifications.

Figure 8:
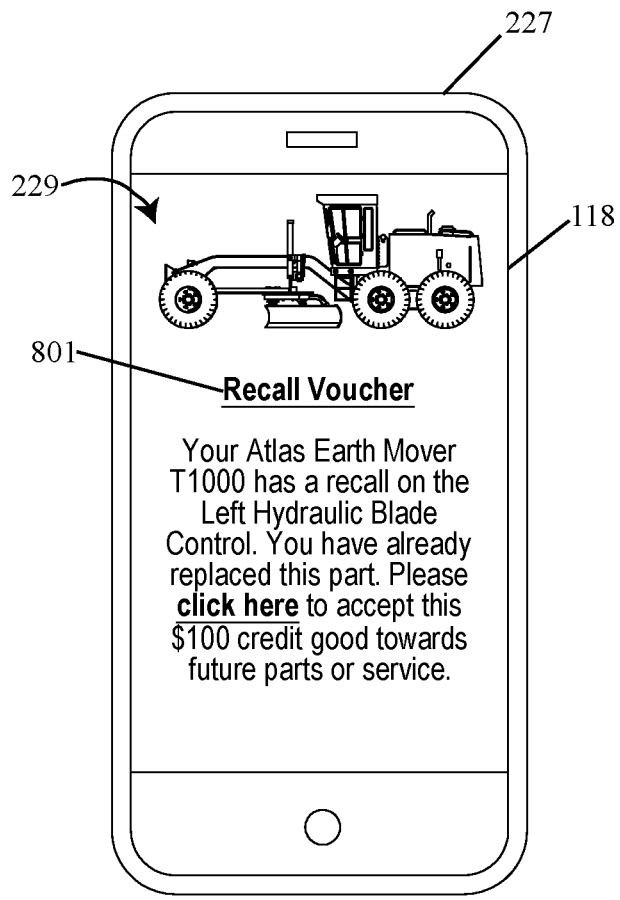
FIG. 8 depicts an illustration of an interface depicting a compensation incentive in accordance with the present disclosure.

FIG. 8, depicts an example of a digital twin interface 229 receiving an incentive, refund or rebate for installing the replacement part 601, as shown in FIG. 6b and thus rendering the recall depicted in FIG. 7 as irrelevant. As shown in FIG. 8, a notification 801 may be provided via the notification engine 215 and alert and explain to the owner of the physical asset 217 that the owner is eligible to receive a credit or other incentive identified by the incentive engine 213 for previously replacing the recalled part with replacement part 601, rather than performing the recall work to install component 701. The owner may click through the incentive notification 801 and claim the refund or rebate credit being offered in this example.

Figure 2B:
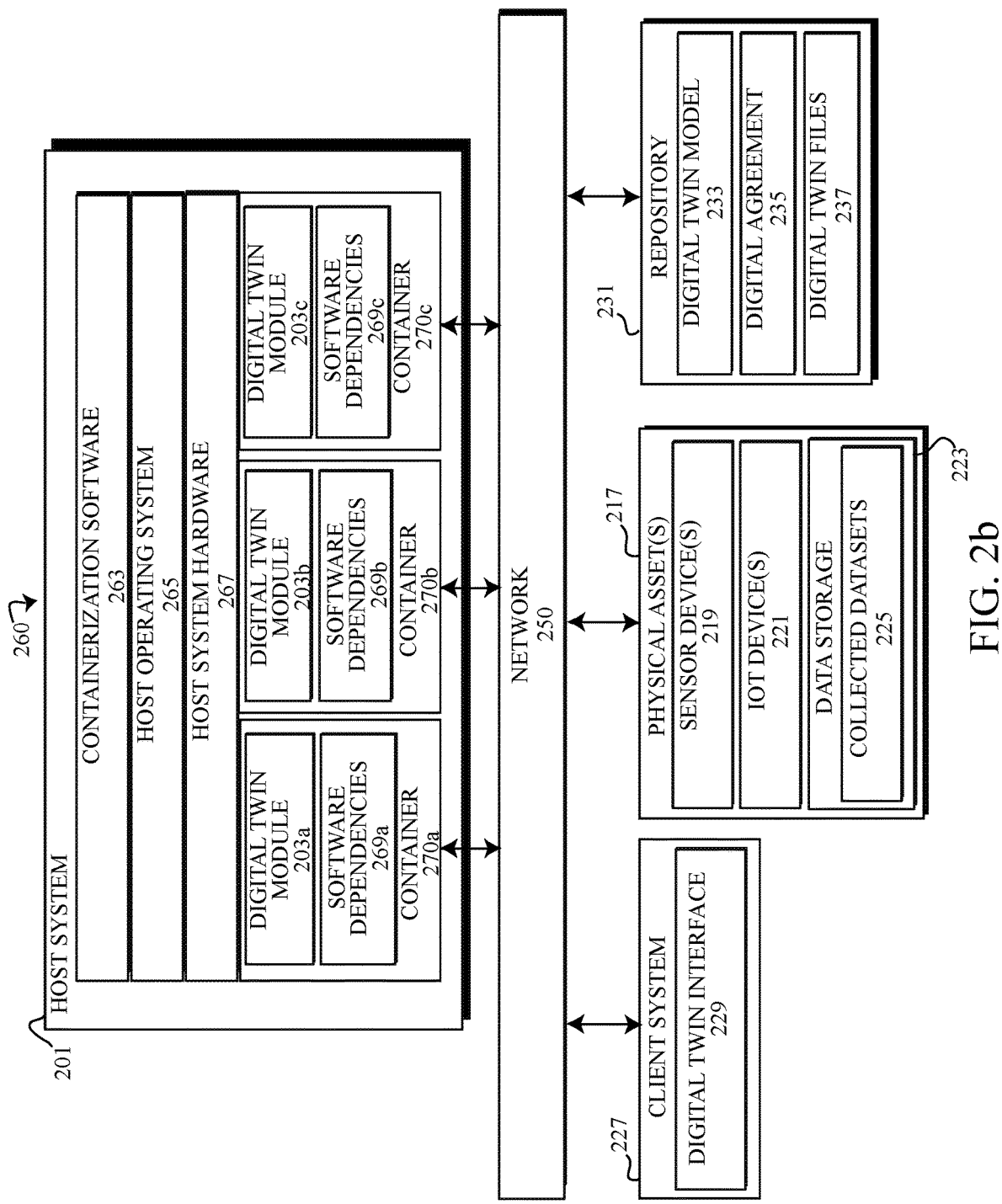
FIG. 2b depicts a block diagram of an alternate embodiment of a computing environment for tracking the maturation of a digital twin over the lifespan of the digital twin and the associated physical asset.

Referring to the drawings, FIG. 2b depicts an alternative embodiment, comprising computing environment 260, wherein host system 201 containerizes the digital twin module 203 into multiple container environments (depicted as container 270a-270c), containing a digital twin module 203a-203c and the software dependencies 269a-269c, within the container's 270 operating environment. The host system 201 may run a multi-user operating system (i.e. the host operating system 265) and provide computing resources via the host system hardware 267 to one or more containers 270a-270c (referred to generally as containers 270) comprising the containerized computer environment for the digital twin module 203 software to execute and perform functions of the digital twin module 203.

Embodiments of computing environment 260 may be organized into a plurality of data centers that may span multiple networks, domains, and/or geolocations. The data centers may reside at physical locations in some embodiments, while in other embodiments, the data centers may comprise a plurality of host systems 201 distributed across a cloud network and/or a combination of physically localized and distributed host systems 201. Data centers may include one or more host systems 201, providing host system hardware 267, a host operating system 265 and/or containerization software 263 such as, but not limited to, the open-source Docker and/or OpenShift software, to execute and run the containerized digital twin module 203 encapsulated within the environment of the containers 270, as shown in FIG. 2b. Although the exemplary embodiment depicted in FIG. 2b includes three containers 270a-270c, the embodiment of FIG. 2b is merely illustrative of the concept that a plurality of containers 270 can be hosted by a host system 201. The embodiment of FIG. 2b should in no way be considered to imply that the host systems 201 is limited to hosting only three containers 270. The number of containers 270 hosted by a host system 201 may vary depending on the amount of computing resources available, based on the host system hardware 267 and the amount of computing resources required by individual digital twin modules 203 being executed within the containers 270 by the containerization software 263.

Embodiments of the containerization software 263 may operate as a software platform for developing, delivering, and running containerized programs and applications, as well as allowing for the deployment of code quickly within the computing environment of the containers 270. Embodiments of containers 270 can be transferred between host systems 201 as well as between different data centers that may be operating in different geolocations, allowing for the containers 270 to run on any host system 201 running containerization software 263. The containerization software 263 enables the host system 201 to separate the containerized applications and programs, such as the containerized digital twin module 203 from the host system hardware 267 and other infrastructure of the host system 201. For example, host system hardware 267 may include one or more processor(s) 103, memory 105, persistent storage 106, cache 107, communications unit 111, communication fabric 112, I/O interface(s) 115, human-readable displays 118 and/or external device(s) 117. The containerization software 263 provides host system 201 with the ability to package and run digital twin module 203 within the isolated environment of the container 270. Isolation and security provided by individual containers 270 may allow the host system 201 to run multiple instances of digital twin module 203 simultaneously on a single host system 201. A container 270 may be lightweight due to the elimination of any need for a hypervisor, typically used by virtual machines. Rather, the containers 270 can run directly within the kernel of the host operating system 265. However, embodiments of digital twin module 203 may benefit from combining virtualization of virtual machines with containerization. For example, the host system 201 may be a virtual machine running containerization software 263.

Embodiments of the containerization software 263 may comprise a containerization engine (not shown). The containerization engine may be a client-server application which may comprise a server program running a daemon process, a REST API specifying one or more interfaces that the digital twin module 203 and/or other programs may use to talk to the daemon process and provide instructions to the digital twin module 203, as well as a command-line interface (CLI) client for inputting instructions. In one embodiment, the client system 227 may input commands using a CLI to communicate with the containerization software 263 of the host system 201. In the exemplary embodiment depicted in FIG. 2b, commands provided by the client system 227 to the host system 201 may be input via the digital twin interface 229 loaded into the memory 105 or persistent storage 106 of the client system 227 interfacing with the host system 201.

Embodiments of the CLI may use the REST API of the containerization engine to control or interact with the daemon through automated scripting or via direct CLI commands. In response to the instructions received from the CLI, via the REST API, the daemon may create and manage the objects of the containerization software 263, including one or more software images residing within the containers 270, the containers 270 themselves, networks, data volumes, plugins, etc. An image may be a read-only template with instructions for creating a container 270 and may be customizable. Containers 270 may be a runnable instance of the software image. Containers 270 can be created, started, stopped, moved or deleted using a containerization software 263 API or via the CLI. Containers 270 can be connected to one or more networks 250, can be attached to a storage device and/or create a new image based on the current state of a container 270.

Embodiments of the host system 201, illustrated in the block diagram of FIG. 2b, depict a plurality of containers 270a-270c, wherein a container 270 may comprise an image of a digital twin module 203 and software dependencies 269a-269c (generally referred to herein as software dependencies 269) for running instances of the digital twin module 203 within the environment of the container 270. Software dependencies 269 may include application code, system tools, settings, runtime environment and system libraries. The images of the digital twin module 203 depicted within the containers 270 may be duplicate versions of the digital twin module 203 image. In some embodiments, the images of the digital twin module 203 may be customized variations of one another, based on a common image used as the basis for the customized variations of the digital twin module 203, while in some embodiments, one or more of the digital twin modules may be independently created and developed using entirely different images.

Method for Tracking the Maturation of Digital Twins

Figure 9A:
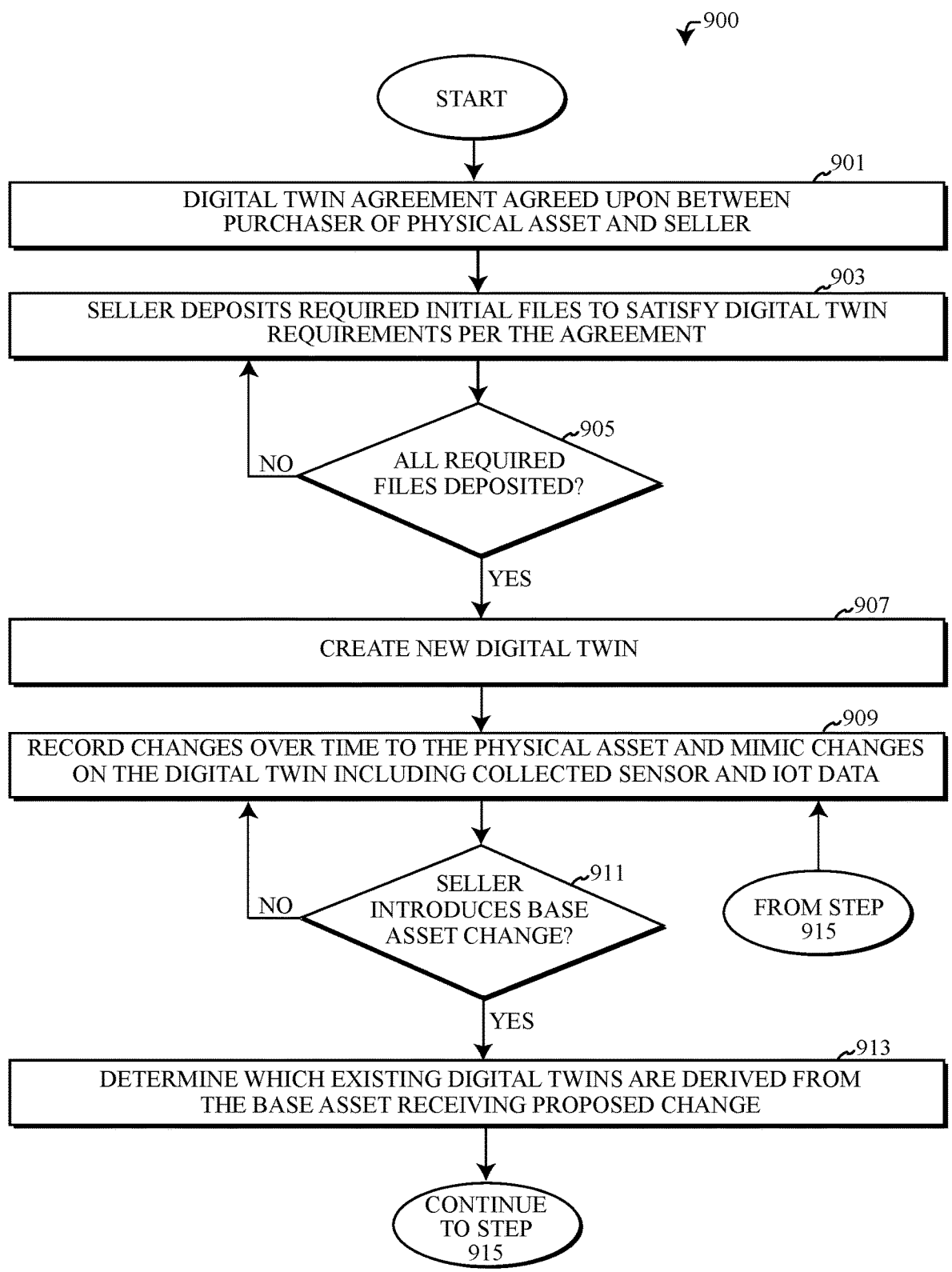
FIG. 9a depicts an embodiment of an algorithm implementing a computerized method for tracking the maturation of a digital twin and permeating relevant changes in accordance with the present disclosure.
Figure 9B:
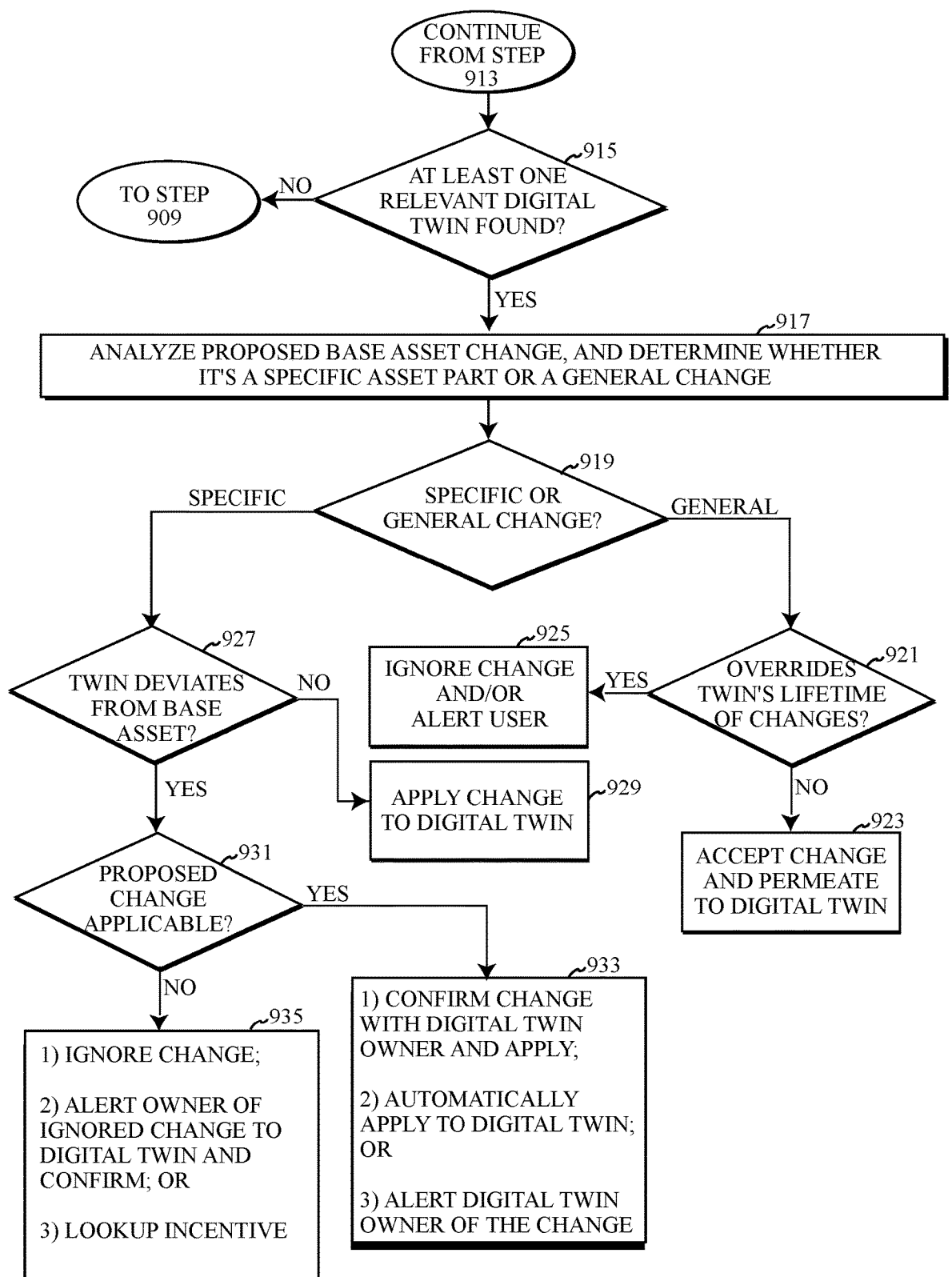
FIG. 9b depicts a continuation of the algorithm of FIG. 9a implementing a computerized method for tracking the maturation of a digital twin and permeating relevant changes in accordance with the present disclosure.

The drawings of FIGS. 9a-9b represent an embodiment of an algorithm 900 performing a computer-implemented method for tracking the maturation of physical asset(s) 217 using digital twins and selectively permeating relevant changes or updates to the physical asset 217 that may be applicable, based on comparisons between the originally created digital twin reflecting the base asset and the mature digital twin reflecting the physical asset 217 in the current state. The algorithm 900, as shown and described by FIGS. 2a-8, may use one or more computer systems, defined generically by data processing system 100 of FIG. 1, and more specifically by the embodiments of specialized data processing systems depicted in FIGS. 2a-8 as described herein. A person skilled in the art should recognize that the steps of the algorithm 900 described in FIGS. 9a-9b may be performed in a different order than presented. The algorithm 900 may not necessarily require all the steps described herein to be performed. Rather, some embodiments of algorithm 900 may alter the methods by performing a subset of steps using one or more of the steps discussed below.

Embodiments of the algorithm 900 may begin at step 901. In step 901, a digital agreement 235 between a purchaser or licensee of a physical asset 217 and a seller or licensor of the physical asset 217 is created. The terms and conditions of the sale or license of the physical asset 217 may be described in the digital agreement 235, including conditions for satisfying the requirements of the digital agreement 235 in order to initiate the creation or transfer of a digital twin to the purchaser or licensor. Embodiments of the digital agreement 235 may be transmitted and stored within repository 231 and may be accessible by the parties to the digital agreement 235 and/or users authorized by the parties to the digital agreement.

In step 903, the seller may deposit one or more of the digital files 237 prescribed by the digital agreement 235 into the repository 231 in order to satisfy one or more conditions of the digital agreement 235 required for initiating the creation or transfer of a digital twin. Digital twin files that may be uploaded to the repository 231 for the purpose of satisfying conditions of the digital agreement may include (but are not limited to) user manuals, bill of materials, warranties, maintenance plans, specifications of the physical asset 217, 3D models or CAD drawings, operating manuals, maintenance schedules, prior usage logs and historical performance data, artificial intelligence (AI) knowledge bases, learning data, and other automation datasets, asset history, ownership history, terms of ownership change and change of ownership documentation.

In step 905, a determination is made by the algorithm 900 to assess whether all the required files prescribed by the digital agreement 235 have been uploaded to the repository 231. If all the required documents prescribed by the digital agreement 235 as the condition for creating a new digital twin or for transferring ownership of an existing digital twin have not been satisfied, the algorithm 900 may proceed back to step 903 and request or alert to the seller or licensor that additional digital twin files 237 should be uploaded to the repository 231. In some embodiments, an alert or notification may be presented to the seller or licensor describing the digital twin files 237 required per the digital agreement 235 and further list or describe and missing or delinquent files that are either missing from the repository 231 or insufficient to satisfy the requirements of the digital agreement 235. Conversely, if the determination is made in step 905 that all digital twin files 237 have been provided to the repository 231, per the conditions of the digital agreement 235, the requirements of the digital agreement may be determined to be satisfied and the algorithm 900 may proceed to step 907.

In step 907 of algorithm 900, a new digital twin may be created to reflect the initial condition of the physical asset 217 received by the purchaser or licensor of the digital twin agreement 235. The newly created digital twin may reflect the base asset received from the seller or licensor, prior to modifications or changes being implemented by either the buyer/licensee or seller/licensor. In some instances, where the buyer is purchasing or licensing an existing physical asset with a mature digital twin that already exists, then upon completion of the conditions of the digital agreement, access to the existing digital twins corresponding to the physical asset 217, including the digital twin depicting the base asset and the mature digital twin depicting the physical asset in a current state, may be authorized. Allowing the buyer or licensee to view, edit, update, etc., the existing digital twin models 233 and digital twin files 237.

In step 909 of the algorithm 900, the digital twin module 203 records changes over time to the physical asset, mimicking the changes occurring in physical space in the mature digital twin, over the lifetime of the physical asset 217. The digital twin models 233 and digital twin files 237 describing the mature digital twin can be altered to reflect the current state of the physical asset 217, as well as updated to reflect the performance thereof. For example, by updating digital twin models 233 to reflect part replacements depicting the introduction of new or replacement parts, updating performance data logs with updated performance data collected by sensor devices 219 or IoT devices integrated into the physical asset 217 and running simulations of the physical asset using simulated digital twins to diagnose problems or optimize performance. The digital twin module 203 may continue recording changes to the mature digital twin as the mature digital twin evolves over time based on the changes implemented by the buyer/licensee and/or changes that have been permeated to the mature digital via proposed changes by the seller/licensor.

In step 911, the algorithm 900 determines whether or not the seller or licensor of the physical asset has introduced a change to the base asset. For example, by making a proposed change request to applicable physical assets 217 and the associated digital twins by submitting the request via the work order module 209. If a seller or licensee of the physical asset 217 has not introduced a proposed change the base asset from which a mature digital twin is derived, the algorithm may return back to step 909, wherein the digital twin module 203 continues to monitor and record changes and performance of the mature digital twin as utilized by the buyer or licensee. Conversely, if the seller or licensor of the physical asset 217 introduces a proposed change, the algorithm may proceed to step 913. In step 913, the digital twin module 209 may determine which existing digital twins, accessible to the seller or licensee, are derived from the base asset that the seller or licensee is proposing the change. The digital twin module 209 may query records stored by repository 231 with parameters defined by the seller/licensee in order to identify existing digital twins sold or produced by the seller or licensee that are derived from a base asset that is being proposed to receive a change. A list of active digital twins may be provided in response to the query, including details describing the base asset associated with the digital twin. For example, providing a base asset name, model number, serial number, etc.

In step 915 of algorithm 900, a determination is made as a function of the query results, whether or not at least one digital twin derived from the base asset being proposed a change is found by the digital twin module 203. If no existing or active digital twins are found by the query, the seller or licensee may revise the search criteria, including revising the base asset being used as the basis for the search. In some embodiments where zero search results are returned for digital twins derived from the base asset being proposed for a change, algorithm 900 may return to step 909, as the active digital twins continue to operate or function in their current state and continue to record changes imposed by the buyer/licensee, as well as continue to record performance data.

Conversely, if the determination is made in step 915 that at least one existing digital twin is found based on the query criteria and the digital twin is derived from the base asset being proposed for the change, the algorithm 900 may proceed to step 917. During step 917, the comparison engine 211 of the digital twin module 203 analyzes the proposed change to the base asset and determines whether the proposed change is a specific change or a general change to the physical assets 217 and mature digital twins identified in step 915 as being derived from the base asset. In step 919 the determination is made based on the analysis of step 917. If the proposed change to the base asset is a general change, the algorithm proceeds to step 921 and further determines whether such a general change overrides or conflicts with the history of changes and experiences of the physical asset 217 over the lifetime of the physical asset 217 (as reflected by the mature digital twin). If the proposed general changes do not override or conflict with the historical changes of the mature digital twin, the proposed changes can be accepted and/or permeated to the mature digital twin. Conversely, if the proposed changes to the base asset are determined in step 921 to override or conflict with the history of changes or experiences documented by the mature digital twin over the lifetime of the physical asset 217, the digital twin module 203 may ignore the propose change, prevent the proposed change from being permeated to the mature digital twin and/or alert the owner or authorized individual associated with the mature digital twin about the proposed change to the base asset. For example, by transmitting a notification via the notification engine 215. Users receiving the notification may accept the decision to prevent the seller or licensee from permeating the proposed change to the mature digital twin or the users receiving the notification may override the decision by the digital twin module 203 and manually allow for the proposed general changes to the base asset to be permeated to the mature digital twin.

Referring back to step 919, if a determination is made that the proposed change to the physical asset 217 and associated mature digital twin is a specific change, the algorithm 900 can proceed to step 927. In step 927, a determination can be made whether the mature digital twin deviates from the base asset originally provided to the buyer or licensee of the digital twin. If the mature digital twin in the current state has not deviated from the base asset, the algorithm 900 may proceed to step 929, wherein the digital twin module 203 can schedule the proposed change to be implemented on the physical asset 217 and permeate the change to the mature digital twin. If, however, a determination is made in step 927 that the mature digital twin has deviated from the digital twin of the base asset, the algorithm may proceed to step 931. In step 931, a further determination may be made whether or not the proposed change to the base asset is applicable or relevant to the physical asset 217 in the current state, as depicted by the mature digital twin.

If, in step 931, the comparison engine 211 of the digital twin module 203 concludes that the proposed change to the mature digital twin is not applicable or relevant, the digital twin module 203 may respond to the change request by ignoring the proposed change and preventing the proposed change from being permeated to the mature digital twin; alerting the owner of mature digital twin about the proposed change that is being ignored or prevented from being permeated to the mature digital twin; and/or lookup whether one or more incentives, refunds, rebates or compensation may be requested as a result of the proposed change no longer being relevant or applicable. If, the incentive engine 213 identifies an applicable mechanism for the owner of the mature digital twin to receive compensation for performing actions that render the proposed change of the base asset irrelevant, the incentive engine 213 can submit the request for compensation and complete the transaction for obtaining compensation. For example, by initiating a payment transaction between the owner and manufacturer or seller, searching the repository for costs and receipts of the work performed to calculate an acceptable value of compensation to request and/or by searching one or more data sources for existing programs or incentives offered by the manufacturer or seller.

Furthermore, if in step 931, a determination is made that the proposed specific change to the physical asset 217 and the associated mature digital twin is relevant or applicable to the current state of the physical asset 217 as represented by the mature digital twin, the algorithm 900 may proceed to step 933. In step 933, the digital twin module 203 may perform an action in response to the proposed change that may comprise: 1) confirming the proposed change with the mature digital twin owner, and upon confirmation from the owner, scheduling the proposed change to be performed and permeating the proposed change to the mature digital twin; 2) automatically scheduling the performance of the proposed change to the physical asset 217 and permeating the proposed change automatically to the mature digital twin; and/or 3) alerting the owner of the mature digital twin that the proposed change to the mature digital twin has been automatically applied. For example, via a notification alert generated by the notification engine 215.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for tracking a current state of a physical asset virtually using a digital twin of the physical asset and facilitating a sale or licensing agreement with potential customer of the physical asset, the computer-implemented method comprising:
    connecting, by at least one processor, at least one sensor device or internet-of-things (IoT) device onboard the physical asset and a repository of digital twin files to a network;
    rendering, by the at least one processor, the digital twin as a 3D model depicting the physical asset as originally received using the digital twin files stored by the repository;
    creating in real-time, by the at least one processor, a new iteration of the 3D model, wherein each rendering of the new iteration of the 3D model comprises physical changes to the physical asset as reflected by data collected from the at least one sensor device or IoT device over time;
    generating, by the at least one processor, a timeline of digital twins comprising the 3D model and each new iteration of the 3D model wherein the timeline of digital twins represent multiple points in time and states of the physical asset represented digitally over a lifetime of the physical asset as the physical asset changes in real-time and logging with each new iteration of the 3D model, details describing changes made to the physical asset;
    receiving, by the at least one processor, an error or diagnostic code from the physical asset indicating a potential problem with the physical asset;
    alerting, by the at least one processor, one or more users of the error or diagnostic code;
    determining, by the at least one processor, one or more resolutions to cure the error or the diagnostic code;
    receiving, by the one or more users, a request indicating a proposed change to the physical asset;
    approving, by at least the processor, the proposed change to the physical asset that does not override or conflict with historical experiences of the physical asset when the proposed change is compared with each entry in the timeline of digital twins over the lifetime of the physical asset up to the current state;
    upon physical alteration of the physical asset in accordance with the proposed change being approved, generating, by the at least one processor, a new digital twin entered into the timeline of digital twins, the new digital twin representing the current state of the physical asset, wherein said new digital twin is rendered as a 3D model of the physical asset incorporating the proposed change to the physical asset;
    determining, by the at least one processor, whether there have been recalls of a defective part by a manufacturer associated with the physical asset;
    in responsive to that there are recalls by the manufacturer, comparing, by the at least one processor, whether the defective part is similar as a replacement part used during the physical alteration of the physical asset and determining, by the at least one processor, no further action is required since the defective part was replaced with the replacement part;
    recommending, by the at least one processor, optimal actions to improve or optimize performance of the physical asset based on at least, actions to cure the error or diagnostic code, the defective parts has been replaced if needed and the proposed change;
    creating one or more digital twin files that captures, at least, but not limited to, history of repairs, history of the replacement of the defective parts, bill of materials, warranties, maintenance plans and the details describing the current state of the physical asset;
    creating a digital agreement for the potential customer that references the one or more digital twin files; and
    determining that all of conditions relating to the digital agreement has been satisfied and transferring the physical asset to the potential customer.

2. The computer-implemented method of claim 1, wherein the proposed change to the physical asset is selected from the group consisting of a recall, maintenance, part replacement, and an update to the digital twin files of the repository which are associated with the physical asset.

3. The computer-implemented method of claim 2, wherein the digital twin files associated with the physical asset are selected from the group consisting of user manuals, bill of material, warranty, maintenance plans, specifications, and CAD drawings.

4. The computer-implemented method of claim 1, further comprising:
determining, by the at least one processor, that the proposed change to the physical asset is a general change to the physical asset.

5. The computer-implemented method of claim 1, wherein, the proposed change is a change to a specific part of the physical asset, the current state of the physical asset as represented by a most recent entry into the timeline of digital twins indicates the proposed change is not relevant to the physical asset in the current state, the computer-implemented method further comprises:
calculating a refund, a rebate and/or an incentive relating to change to the physical asset; and
requesting, by the at least one processor, the refund, the rebate and/or the incentive for alleviating the proposed change in view of the current state of the physical asset as represented by the most recent entry into the timeline of the digital twins.

6. The computer-implemented method of claim 1, wherein the proposed change is a change to a specific part of the physical asset, the current state of the physical asset as represented by a most recent entry into the timeline of digital twins indicates the proposed change is relevant to the physical asset in the current state, the computer-implemented method further comprises:
performing, by the at least one processor, an action selected from the group consisting of requesting confirmation to apply the proposed change, scheduling a work order to apply the proposed change, and automatically applying the proposed change to the new digital twin rendered as the 3D model of the physical asset incorporating the proposed change to the physical asset.

7. The computer-implemented method of claim 5, wherein the refund, the rebate or the incentive for alleviating the proposed change in view of the current state of the physical asset as represented by the most recent entry into the timeline of the digital twins reimburses an owner of the physical asset, costs or a portion of the costs of the proposed change by automatically transferring funds between linked bank accounts.

8. A computer system for tracking a current state of a physical asset virtually using a digital twin of the physical asset and facilitating a sale or licensing agreement with potential customer of the physical asset comprising:
at least one processor;
a physical asset comprising at least one sensor or IoT device onboard the physical asset, connected to the at least one processor;
a repository comprising digital twin files, placed in communication with the at least one processor; and
a computer-readable storage media coupled to the at least one processor, wherein the computer-readable storage media contains program instructions executing a computer-implemented method comprising:
connecting, by at least one processor, at least one sensor device or internet-of-things (IOT) device onboard the physical asset and a repository of digital twin files to a network;
rendering, by the at least one processor, the digital twin as a 3D model depicting the physical asset as originally received using the digital twin files stored by the repository;
creating in real-time, by the at least one processor, a new iteration of the 3D model, wherein each rendering of the new iteration of the 3D model comprises physical changes to the physical asset as reflected by data collected from the at least one sensor device or IoT device over time;
generating, by the at least one processor, a timeline of digital twins comprising the 3D model and each new iteration of the 3D model wherein the timeline of digital twins represent-multiple points in time and states of the physical asset represented digitally over a lifetime of the physical asset as the physical asset changes in real-time and logging with each new iteration of the 3D model, details describing changes made to the physical asset;
receiving, by the at least one processor, an error or diagnostic code from the physical asset indicating a potential problem with the physical asset;
alerting, by the at least one processor, one or mor users of the error or diagnostic code;
determining, by the at least one processor, one or more resolutions to cure the error or the diagnostic code;
receiving, by the one or more users, a request indicating a proposed change to the physical asset;
approving, by at least the processor, the proposed change to the physical asset that does not override or conflict with historical experiences of the physical asset when the proposed change is compared with each entry in the timeline of digital twins over the lifetime of the physical asset up to the current state;
upon physical alteration of the physical asset in accordance with the proposed change being approved, generating, by the at least one processor, a new digital twin entered into the timeline of digital twins, the new digital twin representing the current state of the physical asset, wherein said new digital twin is rendered as a 3D model of the physical asset incorporating the proposed change to the physical asset;
determining, by the at least one processor, whether there have been recalls of a defective part by a manufacturer associated with the physical asset;
in responsive to that there are recalls by the manufacturer, comparing, by the at least one processor, whether the defective part is similar as a replacement part used during the physical alteration of the physical asset and determining, by the at least one processor, no further action is required since the defective part was replaced with the replacement part;
recommending, by the at least one processor, optimal actions to improve or optimize performance of the physical asset based on at least, actions to cure the error or diagnostic code, the defective parts has been replaced if needed and the proposed change;
creating one or more digital twin files that captures, at least, but not limited to, history of repairs, history of the replacement of the defective parts, bill of materials, warranties, maintenance plans and the details describing the current state of the physical asset;
creating a digital agreement for the potential customer that references the one or more digital twin files; and
determining that all of conditions relating to the digital agreement has been satisfied and transferring the physical asset to the potential customer.

9. The computer system of claim 8, wherein the proposed change to the physical asset is selected from the group consisting of a recall, maintenance, part replacement, and an update to the digital twin files of the repository which are associated with the physical asset.

10. The computer system of claim 9, wherein the digital twin files associated with the physical asset are selected from the group consisting of user manuals, bill of material, warranty, maintenance plans, specifications, and CAD drawings.

11. The computer system of claim 8, further comprising:
determining, by the at least one processor, that the proposed change to the physical asset is a general change to the physical asset.

12. The computer system of claim 8, wherein, the proposed change is a change to a specific part of the physical asset, the current state of the physical asset as represented by a most recent entry into the timeline of digital twins indicates the proposed change is not relevant to the physical asset in the current state, the computer-implemented method further comprises:
calculating a refund, a rebate and/or an incentive relating to change to the physical asset; and
requesting, by the at least one processor, the refund, the rebate and/or the incentive for alleviating the proposed change in view of the current state of the physical asset as represented by the most recent entry into the timeline of the digital twins.

13. The computer system of claim 12 wherein the proposed change is a change to a specific part of the physical asset, the current state of the physical asset as represented by a most recent entry into the timeline of digital twins indicates the proposed change is relevant to the physical asset in the current state, the computer-implemented method further comprises:
performing, by the at least one processor, an action selected from the group consisting of requesting confirmation to apply the proposed change, scheduling a work order to apply the proposed change, and automatically applying the proposed change to the new digital twin rendered as the 3D model of the physical asset incorporating the proposed change to the physical asset.

14. The computer system of claim 13, wherein the refund, the rebate or the incentive for alleviating the proposed change in view of the current state of the physical asset as represented by the most recent entry into the timeline of the digital twins reimburses an owner of the physical asset, costs or a portion of the costs of the proposed change by automatically transferring funds between linked bank accounts.

15. A computer program product for tracking a current state of a physical asset virtually using a digital twin of the physical asset and facilitating a sale or licensing agreement with potential customer of the physical asset, comprising:
one or more computer-readable storage media having computer-readable program instructions stored on the one or more computer-readable storage media said program instructions executes a computer-implemented method comprising the steps of:
connecting, by at least one processor, at least one sensor device or internet-of-things (IOT) device onboard the physical asset and a repository of digital twin files to a network;
rendering, by the at least one processor, the digital twin as a 3D model depicting the physical asset as originally received using the digital twin files stored by the repository;
creating in real-time, by the at least one processor, a new iteration of the 3D model, wherein each rendering of the new iteration of the 3D model comprises physical changes to the physical asset as reflected by data collected from the at least one sensor device or IoT device over time;
generating, by the at least one processor, a timeline of digital twins comprising the 3D model and each new iteration of the 3D model wherein the timeline of digital twins represent-multiple points in time and states of the physical asset represented digitally over a lifetime of the physical asset as the physical asset changes in real-time and logging with each new iteration of the 3D model, details describing changes made to the physical asset;
receiving, by the at least one processor, an error or diagnostic code from the physical asset indicating a potential problem with the physical asset;
alerting, by the at least one processor, one or more users of the error or diagnostic code;
determining, by the at least one processor, one or more resolutions to cure the error or the diagnostic code;
receiving, by the one or more users, a request indicating a proposed change to the physical asset;
approving, by at least the processor, the proposed change to the physical asset that does not override or conflict with historical experiences of the physical asset when the proposed change is compared with each entry in the timeline of digital twins over the lifetime of the physical asset up to the current state;
upon physical alteration of the physical asset in accordance with the proposed change being approved, generating, by the at least one processor, a new digital twin entered into the timeline of digital twins, the new digital twin representing the current state of the physical asset, wherein said new digital twin is rendered as a 3D model of the physical asset incorporating the proposed change to the physical asset;
determining, by the at least one processor, whether there have been recalls of a defective part by a manufacturer associated with the physical asset;
in responsive to that there are recalls by the manufacturer, comparing, by the at least one processor, whether the defective part is similar as a replacement part used during the physical alteration of the physical asset and determining, by the at least one processor, no further action is required since the defective part was replaced with the replacement part;
recommending, by the at least one processor, optimal actions to improve or optimize performance of the physical asset based on at least, actions to cure the error or diagnostic code, the defective parts has been replaced if needed and the proposed change;
creating one or more digital twin files that captures, at least, but not limited to, history of repairs, history of the replacement of the defective parts, bill of materials, warranties, maintenance plans and the details describing the current state of the physical asset;
creating a digital agreement for the potential customer that references the one or more digital twin files; and
determining that all of conditions relating to the digital agreement has been satisfied and transferring the physical asset to the potential customer.

16. The computer program product of claim 15, wherein the proposed change to the physical asset is selected from the group consisting of a recall, maintenance, part replacement, and an update to the digital twin files of the repository which are associated with the physical asset.

17. The computer program product of claim 16, wherein the digital twin files associated with the physical asset are selected from the group consisting of user manuals, bill of material, warranty, maintenance plans, specifications, and CAD drawings.

18. The computer program product of claim 15, further comprising:

determining, by the at least one processor, that the proposed change to the physical asset is a general change to the physical asset.

19. The computer program product of claim 15, wherein, the proposed change is a change to a specific part of the physical asset, the current state of the physical asset as represented by a most recent entry into the timeline of digital twins indicates the proposed change is not relevant to the physical asset in the current state, the computer-implemented method further comprises:

calculating a refund, rebate and/or incentive relating to change to the physical asset; and requesting, by the at least one processor, the refund, the rebate and/or the incentive for alleviating the proposed change in view of the current state of the physical asset as represented by the most recent entry into the timeline of the digital twins.

20. The computer program product of claim 15, wherein the proposed change is a change to a specific part of the physical asset, the current state of the physical asset as represented by a most recent entry into the timeline of digital twins indicates the proposed change is relevant to the physical asset in the current state, the computer-implemented method further comprises:

performing, by the at least one processor, an action selected from the group consisting of requesting confirmation to apply the proposed change, scheduling a work order to apply the proposed change, and automatically applying the proposed change to the new digital twin rendered as the 3D model of the physical asset incorporating the proposed change to the physical asset.

* * * * *